United States Patent
Miriyala et al.

(10) Patent No.: US 10,999,251 B2
(45) Date of Patent: May 4, 2021

(54) INTENT-BASED POLICY GENERATION FOR VIRTUAL NETWORKS

(71) Applicant: Juniper Networks, Inc., Sunnyvale, CA (US)

(72) Inventors: Prasad Miriyala, San Jose, CA (US); Sundaresan Rajangam, Santa Clara, CA (US); Miraj Subhashbhai Kheni, San Jose, CA (US); Suresh B Akula, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

(21) Appl. No.: 16/145,682

(22) Filed: Sep. 28, 2018

(65) Prior Publication Data
US 2020/0106744 A1   Apr. 2, 2020

(51) Int. Cl.
*H04L 29/06* (2006.01)
*H04L 12/24* (2006.01)
(Continued)

(52) U.S. Cl.
CPC ...... *H04L 63/0263* (2013.01); *H04L 41/0806* (2013.01); *H04L 41/0893* (2013.01);
(Continued)

(58) Field of Classification Search
CPC .... H04L 63/205; H04L 63/0263; H04L 43/14
(Continued)

(56) References Cited

U.S. PATENT DOCUMENTS 9,641,435 B1    5/2017 Sivaramakrishnan
9,894,100 B2 *  2/2018 Pernicha ............... H04L 63/20
(Continued)

FOREIGN PATENT DOCUMENTS

WO    2013/184846 A1    12/2013

OTHER PUBLICATIONS

"Access Control Using Security Group Firewall"—Cisco Systems, Inc., Oct. 13, 2013 https://www.cisco.com/c/dam/en/us/solutions/collateral/enterprise/design-zone-security/access_control_using_security.pdf (Year: 2013).*
(Continued)

*Primary Examiner* — Randy A Scott
(74) *Attorney, Agent, or Firm* — Shumaker & Sieffert, P.A.

(57) ABSTRACT

Techniques are disclosed for generating intent-based policies and applying the policies to traffic of a computer network. In one example, a policy controller for the computer network receives traffic statistics for traffic flows among a plurality of application workloads executed by a first set of computing devices. The policy controller correlates the traffic statistics into session records for the plurality of application workloads. The policy controller generates, based on the session records for the application workloads, application firewall policies for the application workloads. Each of the application firewall policies define whether traffic flows between application workloads are to be allowed or denied. The policy controller distributes the application firewall policies to a second set of one or more computing devices for application to traffic flows between instances of the application workloads.

18 Claims, 9 Drawing Sheets

(51) Int. Cl.
  *H04L 12/859* (2013.01)
  *H04L 29/08* (2006.01)
  *G06F 15/16* (2006.01)
  *H04L 12/713* (2013.01)

(52) U.S. Cl.
  CPC ........ *H04L 41/142* (2013.01); *H04L 47/2475* (2013.01); *H04L 63/20* (2013.01); *H04L 45/586* (2013.01)

(58) Field of Classification Search
  USPC ..... 709/220, 221, 223, 224; 726/1, 8, 23, 26
  See application file for complete search history.

(56) References Cited

U.S. PATENT DOCUMENTS

| | | | |
|---|---|---|---|
| 2012/0014282 A1 | 1/2012 | Pappu et al. | |
| 2013/0298184 A1* | 11/2013 | Ermagan | G06F 21/54 726/1 |
| 2014/0245423 A1 | 8/2014 | Lee | |
| 2018/0176261 A1* | 6/2018 | Bansal | H04L 41/0893 |

OTHER PUBLICATIONS

U.S. Appl. No. 15/476,136, by Juniper Networks, Inc. (Inventors: Mehta et al.), filed Mar. 31, 2017.
U.S. Appl. No. 15/583,714, by Juniper Networks, Inc. (Inventors: Sivaramakrishnan), filed May 1, 2017.
Hopps, "Analysis of an Equal-Cost Multi-Path Algorithm," RFC 2992, Network Working Group, Nov. 2000, 8 pp.
"IEEE Standard for Local and Metropolitan Area Networks, IEEE Std 802.1ag™—2007—Virtual Bridged Local Area Networks—Amendment 5: Connectivity Fault Management," IEEE Computer Society, LAN/MAN Standards Committee, Dec. 7, 2007, 260 pp.
U.S. Appl. No. 15/819,522, by Juniper Networks, Inc. (Inventors: Miriyala et al.), filed Nov. 21, 2017.
Sajassi et al., "BGP MPLS-Based Ethernet VPN," RFC 7432, Internet Engineering Task Force (IETF), Feb. 2015, 56 pp.
U.S. Appl. No. 16/022,464, by Juniper Networks, Inc. (Inventors: Miriyala et al.), filed Jun. 28, 2018.
Extended European Search Report from counterpart EP Application No. 19180804.7, dated Dec. 17, 2019, 8 pp.
Response to Extended European Search Report from counterpart EP Application No. 19180804.7, dated Sep. 29, 2020, 6 pp.
Examination Report from counterpart European Application No. 19180804.7 dated Mar. 12, 2021, 6 pp.

* cited by examiner

| # | SOURCE ADDRESS | SOURCE PORT | DESTINATION ADDRESS | DESTINATION PORT | PROTOCOL | TAG |
|---|---|---|---|---|---|---|
| 1 | 192.168.0.101 | 80 | 192.168.0.201 | 80 | TCP | Web Application |
| 2 | 192.168.0.101 | 80 | 192.168.0.202 | 80 | TCP | Web Application |
| 3 | 192.168.0.101 | 80 | 192.168.0.203 | 80 | TCP | Web Application |
| 4 | 192.168.0.101 | 80 | 192.168.0.204 | 80 | TCP | Finance Application |
| 5 | 192.168.0.101 | 80 | 192.168.0.205 | 80 | TCP | Finance Application |
| 6 | 192.168.0.102 | 443 | 20.253.181.3 | 443 | TCP | Web Application |
| 7 | 192.168.0.102 | 443 | 63.78.241.93 | 443 | TCP | Finance Application |
| 8 | 192.168.0.102 | 443 | 15.213.251.48 | 443 | TCP | Finance Application |
| 9 | 192.168.0.103 | 25 | 192.168.0.101 | 25 | UDP | Email Application |
| 10 | 192.168.0.103 | 25 | 192.168.0.102 | 25 | UDP | Email Application |

FIG. 6

INTENT-BASED POLICY GENERATION FOR VIRTUAL NETWORKS

TECHNICAL FIELD

The disclosure relates to computer networks and, more specifically, to traffic policies for computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices. Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

The data center may, for example, physically house all of the infrastructure equipment, such as networking and storage systems, redundant power supplies, and environmental controls. In a typical data center, clusters of storage systems and application servers are interconnected via a switch fabric provided by one or more tiers of physical network switches and routers. More sophisticated data centers provide infrastructure spread throughout the world with subscriber support equipment located in various physical hosting facilities. In many examples of data centers, the infrastructure may include a combination of the physical devices, which may be referred to as the "underlay resources," that are linked to and communicate with a variety of virtual resources such as virtual servers, agents, and/or policy controllers, which may be referred to as "overlay resources."

SUMMARY

Techniques are disclosed for generating intent-based firewall policies for a computer network based on analysis of network traffic of the computer network and subsequently applying the policies to the network traffic. In one example, prior to deployment within a production environment, a customer may deploy one or more applications in a development environment for testing. A traffic collector may collect a plurality of session records of traffic statistics for a plurality of traffic flows of a plurality of application workloads operating within the development environment and forward the session records to a policy controller. The policy controller may correlate the plurality of session records of traffic statistics for the plurality of traffic flows into a plurality of session records of traffic statistics for the plurality of application workloads. The policy controller generates, based on the plurality of session records of traffic statistics for the plurality of application workloads, application firewall policies for the application workloads. Each of the plurality of application firewall policies comprises one or more application firewall policy rules, and each of the one or more application firewall policy rules defines whether a virtual router agent operating on a host computing device should allow or deny a traffic flow for a respective application workload.

The policy controller may distribute the application firewall policies to a plurality of virtual router agents for application to traffic flows. Thus, upon deployment of the one or more application in the production environment, the virtual router agents may apply the application firewall policies to the traffic flows. Accordingly, the techniques of the disclosure may allow for a policy controller to automatically generate intent-based application firewall policies for the plurality of application workloads. In other words, the policy controller may use session records of traffic statistics for the application workloads to identify "intended" traffic relationships between the application workloads, and use the "intended" relationships to generate application firewall policies for the plurality of application workloads that allow such "intended" traffic and block other forms of traffic.

A computer network of a data center is a complex environment that may include hundreds or thousands of components, such as applications, virtual machines, virtual routers, etc., that communicate with one another and with external devices. Developing firewall policies for each component that communicates within the data center may be impractical, infeasible, subject to error, and cumbersome to adjust or upgrade. The techniques of the disclosure may provide the technical advantage of the automatic generation of firewall policies that are more comprehensive, accurate, flexible, and efficiently-generated as compared to manual generation of firewall policies.

In one example, the disclosure describes a method comprising: receiving, by a policy controller for a computer network, traffic statistics for a plurality of traffic flows among a plurality of application workloads, the plurality of application workloads executed by a first set of one or more computing devices of a computer network; correlating, by the policy controller, the traffic statistics for the plurality of traffic flows into session records of traffic statistics for the plurality of application workloads; generating, by the policy controller and based on the session records of traffic statistics for the plurality of application workloads, one or more application firewall policies for the plurality of application workloads, wherein the one or more application firewall policies define whether traffic flows between application workloads of the plurality of application workloads are to be allowed or denied; and distributing, by the policy controller, the one or more application firewall policies to a second set of one or more computing devices for application to traffic flows between instances of the application workloads.

In another example, the disclosure describes a policy controller of a computer network, the policy controller executing on processing circuitry and configured to: receive traffic statistics for a plurality of traffic flows among a plurality of application workloads, the plurality of application workloads executed by a first set of one or more computing devices of a computer network; correlate the traffic statistics for the plurality of traffic flows into session records of traffic statistics for the plurality of application workloads; generate, based on the session records of traffic statistics for the plurality of application workloads, one or more application firewall policies for the plurality of application workloads, wherein the one or more application firewall policies define whether traffic flows between application workloads of the plurality of application workloads are to be allowed or denied; and distribute the one or more application firewall policies to a second set of one or more computing devices for application to traffic flows between instances of the application workloads.

In another example, the disclosure describes a non-transitory computer-readable medium comprising instructions that, when executed, cause processing circuitry executing a policy controller for a computer network to: receive traffic statistics for a plurality of traffic flows among a plurality of application workloads, the plurality of application workloads executed by a first set of one or more computing devices of a computer network; correlate the traffic statistics for the plurality of traffic flows into session records of traffic statistics for the plurality of application workloads; generate, based on the session records of traffic statistics for the plurality of application workloads, one or more application firewall policies for the plurality of application workloads, wherein the one or more application firewall policies define whether traffic flows between application workloads of the plurality of application workloads are to be allowed or denied, distribute the one or more application firewall policies to a second set of one or more computing devices for application to traffic flows between instances of the application workloads.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIG. 6 is a table illustrating a plurality of example session records of traffic statistics for traffic flows in accordance with techniques of the disclosure.

The drawings and the description provided herein illustrate and describe various examples of the inventive methods, devices, and systems of the present disclosure. However, the methods, devices, and systems of the present disclosure are not limited to the specific examples as illustrated and described herein, and other examples and variations of the methods, devices, and systems of the present disclosure, as would be understood by one of ordinary skill in the art, are contemplated as being within the scope of the present application.

DETAILED DESCRIPTION

Figure 1:
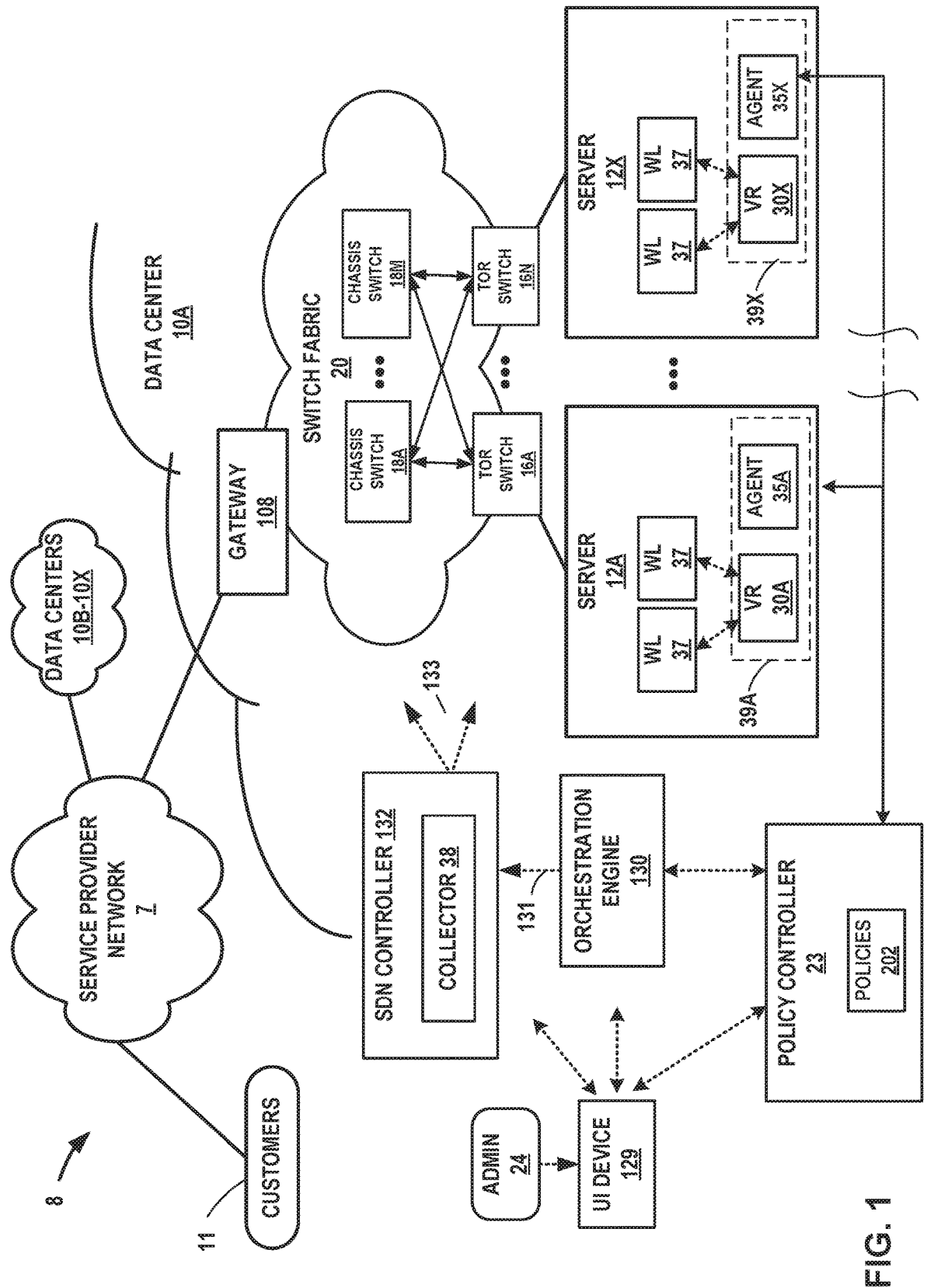
FIG. 1 is a block diagram illustrating an example computer network system in accordance with techniques described herein.

FIG. 1 is a block diagram illustrating an example computer network system 8 in accordance with techniques described herein. Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads 37 (indicated as "WL" in FIG. 1). As described herein, the terms "application workloads 37" or "workloads 37" may be used interchangeably to refer to application workloads 37. Workloads 37 may execute on a virtualized environment, such as a virtual machine, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines, containers, or other virtual execution environment for running one or more services (such as virtualized network functions (VNFs)).

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39") that performs data forwarding and traffic statistics collection functions for workflows ("WFs 37" of FIG. 1) executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30. VR agents 35 operate as respective policy agents for respective servers 12 and may alternatively be referred to as policy agents. Alternatively, a policy agent may correspond to a sub-component or function of a VR agent 35.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router of a forwarding component executing on one of servers 12 may receive inbound tunnel packets of a packet flow from TOR switches 16 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 12 are described in U.S. patent application Ser. No. 14/228,844, filed Mar. 28, 2014 and entitled "PACKET SEGMENTATION OFFLOAD FOR VIRTUAL NETWORKS," incorporated herein by reference.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

In some examples, system 8 performs session sampling and logging of traffic flow and traffic statistics. Virtual routers 30 of forwarding components 39 perform routing services between WLs 37, such as forwarding network traffic between an originator WL 37 of the network traffic and a destination WL 37 for the network traffic. Virtual routers 30 process both ingress and egress flows of network traffic forwarded by each virtual router 30 to generate traffic flow statistics. The traffic flow statistics may include metrics such as bandwidth consumption, traffic routing and pathing, and application use.

Each virtual router 30 communicates the traffic flow statistics to a corresponding VR agent 35 of forwarding component 39. Each VR agent 35 may process the traffic flow statistics for the ingress flows and egress flows to identify pairs of the ingress and egress flows corresponding to a common communication session between workflows 37. For each identified pair, VR agent 35 generates session records of traffic statistics for the network traffic forwarded by virtual router 30. In some cases, the session records may be for unidirectional traffic flows. VR agent 35 uploads the session records, along with tag information for a given flow, to traffic collector 38 of SDN controller 32 for cloud data center 10. Traffic collector 38 receives session records from a plurality of VR agents 35 and stores these session records in an analytics database for use by an administrator 24 of cloud data center 10. User interface device 129 may access such metrics via an interface and generate a user interface to assist administrator 24 in detecting and diagnosing network performance issues of the cloud data center. Furthermore, and discussed in more detail below, traffic collector 38 may forward the session records to policy controller 23 for analysis in accordance with the techniques of the disclosure.

In some examples, the session records include various information and metadata that describe a traffic flow. For example, a session record may include 5-tuple information, such as a source address of the traffic flow, a source port of the traffic flow, a destination address of the traffic flow, a destination port of the traffic flow, and a protocol of the traffic flow. In other examples, the session record may also include other information, such as a virtual network of the traffic flow, a source virtual machine interface (VMI) and/or destination VMI of the traffic flow, one or more tags for a source of the traffic flow, one or more tags for a destination of the traffic flow, an IP prefix of the traffic flow, a service port for the traffic flow, a service protocol for the traffic flow, an action for the traffic flow, a virtual machine identifier for the traffic flow, an operating system for an application workload associated with the traffic flow, one or more software packages installed on the operating system for the application workload associated with the traffic flow, or a version of application workload 37 associated with the traffic flow.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure. Further example techniques by which user interface device 129 may present such metrics to assist administrator 24 in detecting and diagnosing network performance issues of the cloud data center are described in U.S. patent application Ser. No. 16/022,464, entitled "INTER-APPLICATION WORKLOAD NETWORK TRAFFIC MONITORING AND VISUALIZATION," incorporated herein by reference in its entirety.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

Virtual routers (virtual router 30A to virtual router 30X, collectively "virtual routers 30" in FIG. 1) execute multiple routing instances for corresponding virtual networks within data center 10A and routes the packets to appropriate workload 37 executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 12 may receive inbound tunnel packets of a packet flow from one or more TOR switches 16 within switch fabric 20 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 12 are described in U.S. patent application Ser. No. 14/228,844, entitled "PACKET SEGMENTATION OFFLOAD FOR VIRTUAL NETWORKS," incorporated herein by reference in its entirety.

In some example implementations, virtual routers 30 executing on servers 12 steer received inbound tunnel packets among multiple processor cores to facilitate packet processing load balancing among the cores when processing the packets for routing to one or more virtual and/or physical machines. As one example, server 12A includes multiple network interface cards and multiple processor cores to execute virtual router 30A, and steers received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offload flows to one or more other processor cores, in accordance with a hash function applied to at least one of the inner and outer packet headers, for processing to take advantage of available work cycles of the other processor cores.

In the example of FIG. 1, data center 10A further includes a policy controller 23 that provides monitoring, scheduling, and performance management for data center 10A. Policy controller 23 interacts with policy agents 35A-35X (collectively "policy agents 35" or "agents 35"), which are deployed within at least some of the respective physical servers 12 for monitoring resource usage of the physical compute nodes as well as any virtualized host, such as WL 37, executing on the physical host. In this way, policy agents 35 provide distributed mechanisms for collecting a wide variety of usage metrics as well as for local enforcement of policies installed by policy controller 23. In example implementations, policy agents 35 run on the lowest level "compute nodes" of the infrastructure of data center 10A that provide computational resources to execute application workloads. A compute node may, for example, be a bare-metal host of server 12, a workload 37, a container or the like.

As shown in the example of FIG. 1, policy controller 23 may define and maintain a rule base as a set of policies 202 based on the plurality of session records of traffic statistics as described below. Policy controller 23 may administer control of each of servers 12 based on the set of policies 202 maintained by policy controller 23. Policies 202 may be created or derived in response to input by administrator 24 and/or in response to operations performed by policy controller 23 as described above. In some examples, policy controller 23 may additionally, for example, observe operations of data center 10A over time and apply machine learning techniques to generate one or more policies 202. Policy controller 23 may periodically, occasionally, or continually refine policies 202 as further observations about data center 10A are made.

Policy controller 23 (e.g., an analytics engine within policy controller 23) may determine how policies are deployed, implemented, and/or triggered at one or more of servers 12. For instance, policy controller 23 may be configured to push one or more policies 202 to one or more of the policy agents 35 executing on servers 12. Policy controller 23 may receive information about internal processor metrics from one or more of policy agents 35, and determine if conditions of a rule for the one or more metrics are met. Policy controller 23 may analyze the internal processor metrics received from policy agents 35, and based on the analysis, instruct or cause one or more policy agents 35 to perform one or more actions to modify the operation of the server associated with a policy agent. For example, policy controller 23 may push one or more policies including configurations for communication protocols to be used, intervals for issuing the communication probes, and/or metrics to be monitored for use in conjunction with the agents issuing the communication probes between agents. Information collected from the policy agents related to the issuance and monitoring of these communication probes may be used to generate a dashboard including graphical user interfaces that visually depict one or more status related to the metrics associated with and/or derived from the collected information and data associated with the issuance of the communication probes. In another example, policy controller 23 may be configured to gather information about the devices and arrangement of devices included in the switch fabric 20, and generate a set of graphical user interfaces that visually depict these devices and the interconnections between these devices based on a set of predefined and/or user selectable rules.

In various examples, policy controller 23 distributes policy rules including tags for objects at a project level. However, policy controller 23 may additionally or alternatively distributing policy rules including tags specifying various different object levels, such as a global environment level, a project level, a virtual network level, a virtual machine level, or an interface level.

Policy controller 23 may be implemented as any suitable computing system, such as a mobile or non-mobile computing device operated by a user and/or by administrator 24. Policy controller 23 may, for example, represent a workstation, a laptop or notebook computer, a desktop computer, a tablet computer, or any other computing device that may be operated by a user and/or present a user interface in accordance with one or more aspects of the present disclosure. In some examples, policy controller 23 executes on one of servers 12. In another example, policy controller 23 is distributed across one or more computing devices. In some examples, policy controller is a dedicated controller executing on dedicated hardware.

In accordance with the techniques of the disclosure, policy controller 23 may generate intent-based firewall policies for network 8 based on analysis of traffic flows of network 8. As discussed above, policy controller 23 may receive, from traffic collector 38, a plurality of session records of traffic statistics for a plurality of traffic flows serviced by plurality of VR agents 35. Policy controller 23 correlates the plurality of session records of traffic statistics for the plurality of traffic flows into a plurality of session records of traffic statistics for the plurality of workloads 37.

In one example, to correlate the session records for the traffic flows into the session records for workloads 37, the policy controller 23 presents, via UI device 129, the plurality of session records of traffic statistics for the plurality of traffic flows to a user or administrator. Further, policy controller 23 receives, via UI device 129, an input that specifies which traffic flows of the plurality of traffic flows correspond to a respective application workload 37 of the plurality of application workloads 37, and based on the input, aggregates the session records for the traffic flows into the session records for workloads 37.

In another example, policy controller 23 correlates the session records for the traffic flows into the session records for workloads 37 based on one or more tags specified by the session records for the traffic flows. For example, the session records for the traffic flows may specify one or more tags that correspond to tags with which workloads 37 are tagged. Policy controller 23 may use such tags to match workloads 37 to particular ones of the session records for the traffic flows and based on the matching tags, aggregates the session records for the traffic flows into the session records for workloads 37.

In another example, policy controller 23 correlates the session records for the traffic flows into the session records for workloads 37 as described herein. Further, policy controller 23 may generate, from the session records for the traffic flows, one or more tags that correspond to tags with which workloads 37 are tagged and apply the generated tags to the session records. For example, policy controller 23 may use meta data in the session records to generate one or more tags that correspond to tags with which workloads 37 are tagged and apply the generated tags to the session records. Policy controller 23 may aggregate, based on the tags, the session records for the traffic flows into the session records for workloads 37. Further, as described in more detail below, policy controller 23 may use the generated tags to generate one or more application policies for application to traffic flows between instances of workloads 37.

In another example, policy controller 23 correlates the session records for the traffic flows into the session records for workloads 37 by applying a clustering algorithm to the session records for the traffic flows. For example, policy controller 23 may use the clustering algorithm to identify relationships between the session records for the traffic flows and specific workloads 37, and based on the relationships, aggregate the session records for the traffic flows into the session records for workloads 37. In some examples, the clustering algorithm is one of a K-Means clustering algorithm, a Mean-Shift clustering algorithm, a Density-based Spatial Clustering of Applications with Noise (DBSCAN) clustering algorithm, an Expectation-Maximization (EM) clustering algorithm that may use Gaussian Mixture Models (GMM), or an Agglomerative Hierarchical clustering algorithm.

Policy controller 23 generates, based on the plurality of session records of traffic statistics for the plurality of workloads 37, application firewall policies 202 for the plurality of workloads 37. Each of the plurality of application firewall policies comprises one or more application firewall policy rules, and each of the one or more application firewall policy rules defines whether one of VR agents 35 should allow or deny a traffic flow for a respective workload 37. For example, policy controller 23 may use a 5-tuple of a session record for a workload 37 to define a 5-tuple for an application firewall policy rule. Furthermore, policy controller 23 may define, based on the session record, a rule for the application firewall policy rule (e.g., allow, block, log, or report traffic that corresponds to the rule). In some examples, each application firewall policy rule specifies a default rule to allow corresponding network traffic, and all other network traffic that does not match a generated application firewall policy rule is blocked.

In an example implantation of the techniques of the disclosure, policy controller 23 uses a plurality of configuration objects to implement the one or more policies. As one example, policy controller 23 applies a first set of configuration objects at a global level. The first set configuration objects includes global application policy sets, global firewall policies, global firewall rules, and global tags across a plurality of levels and/or categories. Policy controller 23 distributes, for example to the virtual routers, the first set of configuration objects at the global level. Policy controller 23 match global tags associated with global application policy sets, global firewall policies, and global firewall rules to objects tagged with the global tags. Based on the global application policy sets, global firewall policies, and global firewall rules, policy controller 23 allow or block network traffic between interfaces of the objects tagged with the global tags. The interfaces may be virtual machine interfaces (VMIs), for instance.

Furthermore, policy controller 23 applies a second set of configuration objects at a project level. The second set of policy rules may include project-specific application policy sets, firewall policies, firewall rules, and tags across a plurality of levels. Policy controller 23 distributes the second set of configuration objects at the project level. Policy controller 23 matches project tags associated with project-specific application policy sets, firewall policies, and firewall rules to objects tagged with the project tags. Based on the project-specific application policy sets, firewall policies, and firewall rules, policy controller 23 allows or blocks network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks," which is incorporated by reference in its entirety.

Virtual routers 30 may receive and apply application policies relevant to executing workloads 37 on the corresponding server 12, which results in traffic statistics for flows of flow sessions managed in part by the application policies. Such application policies may specify different action with respect to the flows. For example, an application policy may specify that a flow should be allowed, blocked, logged, reported, etc. As described in further detail below, virtual agents 35 upload traffic statistics for the flow sessions to collector 38 or directly to policy controller 23.

In some examples, policy controller 23 presents, via UI device 129, the one or more application firewall policies to a user or administrator for review. In response to receiving an input from the user or administrator approving of the one or more application firewall policy rules, policy controller 23 distributes the one or more application firewall policy rules to VR agents 35 for application to network traffic.

In one example of the techniques of the disclosure, prior to deployment within a production environment, a customer may develop one or more applications in a development environment for testing. Virtual routers 30 process both ingress and egress flows of network traffic generated by the one or more applications and forwarded by each virtual router 30 to generate traffic flow statistics. Each virtual router 30 communicates the traffic flow statistics to a corresponding VR agent 35 of forwarding component 39. Each VR agent 35 processes the traffic flow statistics for the ingress flows and egress flows to identify pairs of the ingress and egress flows corresponding to a common communication session between workflows 37. For each identified pair, VR agent 35 generates session records of traffic statistics for the network traffic forwarded by virtual router 30. VR agent 35 uploads the session records, along with tag information for a given flow, to traffic collector 38 of SDN controller 32 for cloud data center 10. Traffic collector 38 receives session records from a plurality of VR agents 35 and forwards the session records to policy controller 23 for analysis in accordance with the techniques of the disclosure.

Policy controller 23 receives, from traffic collector 38, the session records of traffic statistics for the traffic flows serviced by VR agents 35. Policy controller 23 correlates the plurality of session records of traffic statistics for the plurality of traffic flows into a plurality of session records of traffic statistics for the plurality of workloads 37 operating within the development environment. Policy controller 23 generates, based on the plurality of session records of traffic statistics for the plurality of workloads 37, application firewall policies 202 for the plurality of workloads 37. Each of the plurality of application firewall policies comprises one or more application firewall policy rules, and each of the one or more application firewall policy rules defines whether one of VR agents 35 should allow or deny a traffic flow for a respective workload 37. Policy controller 23 distributes the application firewall policies to VR agents 35 for application to traffic flows. Thus, upon deployment within the production environment, VR agents 35 may apply the application firewall policies to traffic flows within the production environment. Accordingly, the techniques of the disclosure may allow for policy controller 23 to automatically generate intent-based application firewall policies for workloads 37. In other words, policy controller 23 may use the session records of traffic statistics for workloads 37 to identify "intended" traffic relationships between workloads 37 within the development environment and use the "intended" relationships to generate application firewall policies for workloads 37 for use in the production environment so as to allow such "intended" traffic and block other forms of traffic. Therefore, the techniques of the disclosure may allow for the creation of firewall policies that are more comprehensive, accurate, flexible, and efficiently generated over conventional methods.

Figure 2:
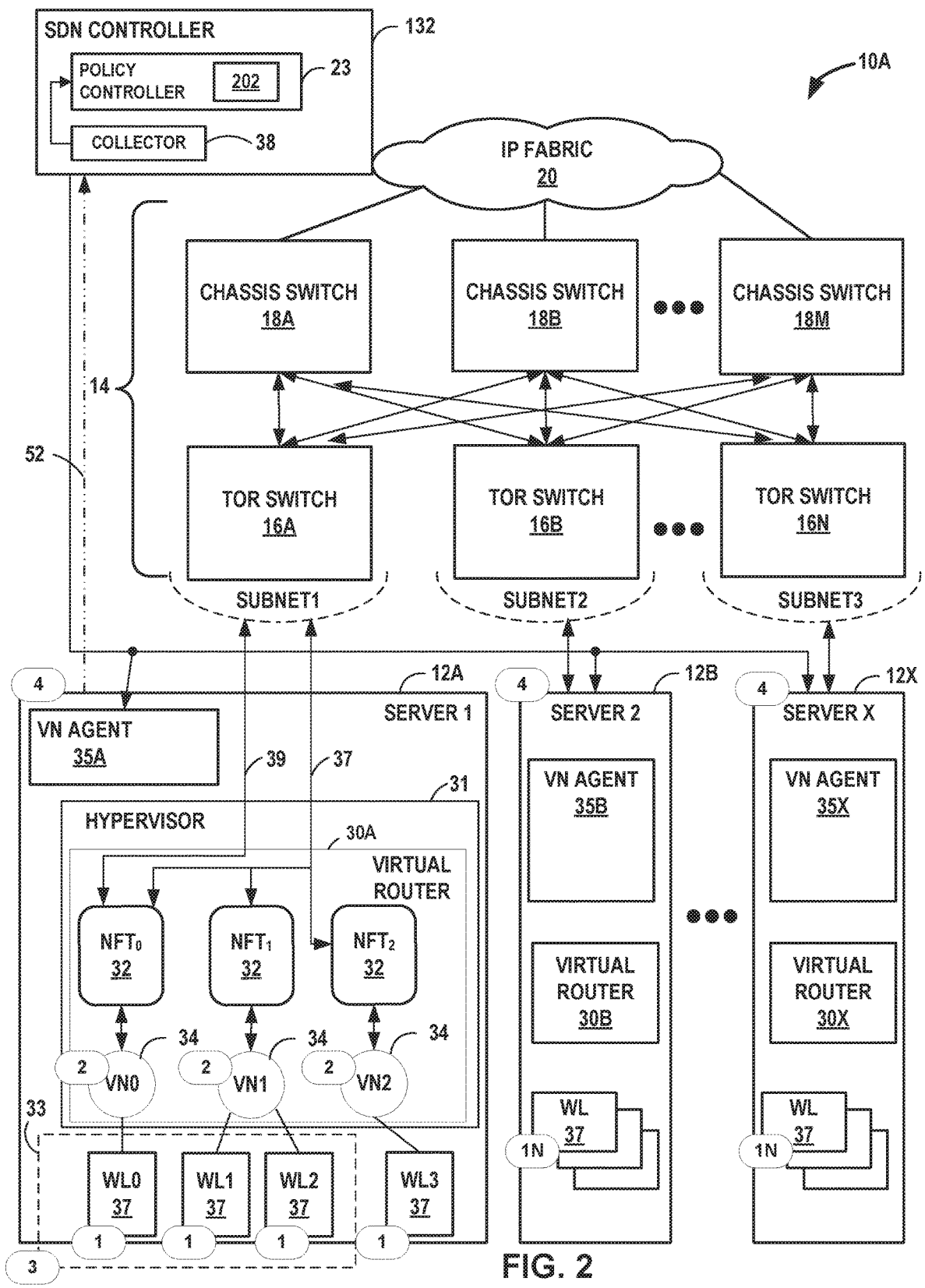
FIG. 2 is a block diagram illustrating an example implementation of a data center of FIG. 1 in further detail.

FIG. 2 is a block diagram illustrating an example implementation of data center 10A of FIG. 1 in further detail. In the example of FIG. 2, data center 10A includes an overlay network that extends switch fabric 20 from physical switches 16, 18 to software or "virtual" routers 30A-30X (again, collectively "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing workloads 37. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more workloads (WLs) 37 on top of the virtualization platform provided by hypervisor 31. Each WL 37 is associated with one of the virtual networks VN0-VN1 and may represent tenant WLs running customer applications such as Web servers, database servers, enterprise applications, or hosting virtualized services used to create service chains. In some cases, any one or more of servers 12 or another computing device may host customer applications directly, i.e., not as virtual machines. In some cases, some of WLs 37 may represent containers, another form of virtualized execution environment. That is, both virtual machines and containers are examples of virtualized execution environments for executing workloads.

In general, each WL 37 may be any type of software application and may execute on a virtualized environment, e.g., a virtual machine or container, that is assigned a virtual address for use within a corresponding virtual network 34, where each of the virtual networks may be a different virtual subnet provided by virtual router 30A. A virtualized environment may be assigned its own virtual layer three (L3) IP address, for example, for sending and receiving communications but may be unaware of an IP address of the physical server 12A on which the virtualized environment is executing. In this way, a "virtual address" is an address that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with SDN controller 132, which generates commands to control routing of packets through data center 10A. VN agents 35 may operate as a proxy for control plane messages between workloads 37 and SDN controller 132. For example, a WL 37 may request to send a message using its virtual address via the VN agent 35A, and VN agent 35A may in turn send the message and request that a response to the message be received for the virtual address of the WL 37 that originated the first message. In some cases, a WL 37 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by workloads 37 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, SDN controller 132 provides a logically centralized controller for facilitating operation of one or more virtual networks within data center 10A. SDN controller 132 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In some examples, SDN controller 132 (or "virtual networking controller 132") further includes policy controller 23. In some examples, SDN controller 132 and policy controller 23 execute on the same computing devices (e.g., one of servers 12). In some examples, SDN controller 132 and policy controller 23 execute on different computing devices (e.g., different ones of servers 12). Policy controller 23 is configured to tag a plurality of objects ("policy objects") across a plurality of levels. In some examples, the plurality of levels includes a level of an object, such as a global environment level, a project level, a virtual network level, a virtual machine level, or an interface level of the object. A policy object may be associated with one or more workloads. In further examples, policy controller 23 tags the plurality of objects across a plurality of categories, which may include a top category and one or more sub-categories. In some examples, the plurality of categories include applications executing within WLs 37, deployments, application tiers, geographic sites, virtual networks, WLs 37, interfaces, projects, security requirements, quality requirements, users, or compliance requirements.

Virtual router 30A of forwarding component 39A performs session monitoring and logging of traffic flow and traffic statistics. In one example, virtual router 30A of forwarding component 39A processes forward traffic flows forwarded by virtual router 30A and reverse traffic flows forwarded by virtual router 30A to generate traffic flow statistics for the traffic flows. In some examples, the traffic flow statistics for each flow include a five-tuple (e.g., a protocol, a source address, a source port, a destination address, and a destination port), a count of the packets forwarded for the flow, and/or a count of bytes forwarded for the flow. Virtual router 30A periodically communicates the generated traffic flow statistics to VR agent 35A such that VR agent maintains a similar record of the traffic flow statistics for traffic flowing through virtual router 30A.

VR agent 35A processes the generated traffic flow statistics to identify pairs of ingress traffic flows and egress traffic flows that correspond to a common communication session between one or more workloads 37. In one example, VR agent 35A identifies pairs of ingress traffic flows and egress traffic flows that correspond to a common communication session. In one example, VR agent 35A processes the traffic statistics generated by virtual router 30A to compare a protocol, a source address, a source port, a destination address, and a destination port (e.g., a five-tuple) of each sampled ingress packet flow and each egress packet flow. For example, if a first ingress flow has the same protocol as a first egress flow, if the source address and source port of the first ingress flow are the same as the destination address and the destination port of the first egress flow, and if the destination address and the destination port of the first ingress flow are the same as the source address and source port of the first egress flow, then VR agent 35A determines that the first ingress flow and the first egress flow correspond to a common communication session between two devices. However, if a second ingress flow does not have the same protocol as a second egress flow, or if the source address and source port of the second ingress flow are not the same as the destination address and the destination port of the second egress flow, or if the destination address and the destination port of the second ingress flow are not the same as the source address and source port of the second egress flow, then VR agent 35A determines that the second ingress flow and the second egress flow do not correspond to a common communication session between two devices.

For each identified pair of ingress and egress traffic flows, VR agent 35A generates session records of traffic statistics for the network traffic forwarded by virtual router 30A. In other words, VR agent 35A generates records of traffic statistics for the network traffic forwarded by virtual router 30A, wherein each record includes traffic statistics that pertain to a common communication session between two devices, and includes traffic statistics for an ingress traffic flow and an egress traffic flow for the common communication session.

In some examples, VR agent 35A generates such session records of traffic statistics for each traffic flow received by virtual router 30A. In other examples, VR agent 35A generates session records of traffic statistics for only a subset of the traffic flows received by virtual router 30A to generate session records of traffic statistics for a subset of the traffic flowing through virtual router 30A. In some examples, the subset of the traffic flows is selected at random. In yet further examples, the subset of the traffic flows is selected according to an algorithm to provide a statistically accurate representation of the traffic flows received by virtual router 30A. In some examples, VR agent 35A receives, from controller 132, an indication of one or more traffic flows that comprise the subset for which to generate the session records of traffic statistics.

In one example, a single session record 52 may include a number of "diff bytes" for both the ingress flow and egress flow associated with the session. Such "diff bytes" describe a number of bytes received for the ingress flow and a number of bytes received for the egress flow during the previous monitoring period (e.g., the difference in bytes between the end of the previous monitoring period and the end of the current monitoring period). Further, the session record 52 may include additional traffic flow and traffic statistics information, such as the total number of bytes forwarded for both the ingress flow and egress flow, an uptime both the ingress flow and egress flow, address, port and forwarding information associated with each of the ingress flow and egress flow, etc.

VR agent 35A uploads the session record 52 to traffic collector 38 which, in this example, is a component of SDN controller 132. In some examples, VR agent 35A periodically uploads a group of session records 52 generated during the previous sampling period (e.g., VR agent uploads the group of session records 52 to traffic collector 38 approximately once per second, once per minute, or once per day). Traffic collector 38 writes session-correlated traffic flow and traffic statistics information for the session record 52 into analytics database 35.

In accordance with the techniques of the disclosure, policy controller 23 may generate intent-based firewall policies 202 for data center 10A based on analysis of traffic flows of data center 10A. As discussed above, policy controller 23 may receive, from traffic collector 38, a plurality of session records of traffic statistics for a plurality of traffic flows serviced by plurality of VR agents 35. Policy controller 23 correlates the plurality of session records of traffic statistics for the plurality of traffic flows into a plurality of session records of traffic statistics for the plurality of workloads 37.

In one example, to correlate the session records for the traffic flows into the session records for workloads 37, the policy controller 23 presents, via UI device 129 of FIG. 1, the plurality of session records of traffic statistics for the plurality of traffic flows to a user or administrator. Further, policy controller 23 receives, via UI device 129, an input that specifies which traffic flows of the plurality of traffic flows correspond to a respective application workload 37 of the plurality of application workloads 37, and based on the input, aggregates the session records for the traffic flows into the session records for workloads 37.

In another example, policy controller 23 correlates the session records for the traffic flows into the session records for workloads 37 based on one or more tags specified by the session records for the traffic flows. For example, the session records for the traffic flows may specify one or more tags that correspond to tags with which workloads 37 are tagged. Policy controller 23 may use such tags to match workloads 37 to particular ones of the session records for the traffic flows and based on the matching tags, aggregates the session records for the traffic flows into the session records for workloads 37.

In an example implantation of the techniques of the disclosure, policy controller 23 uses a plurality of configuration objects to aggregate the session records for the traffic flows into the session records for workloads 37. As one example, policy controller 23 applies a first set of configuration objects at a global level. The first set configuration objects includes global application policy sets, global firewall policies, global firewall rules, and global tags across a plurality of levels and/or categories. Policy controller 23 distributes, for example to virtual routers 30, the first set of configuration objects at the global level. Policy controller 23 matches global tags of the session records for the traffic flows associated with global application policy sets, global firewall policies, and global firewall rules to objects tagged with the global tags. For example, policy controller 23 uses such global tags of the session records for the traffic flows to match workloads 37 to particular ones of the session records for the traffic flows and based on the matching tags, aggregates the session records for the traffic flows into the session records for workloads 37.

Furthermore, policy controller 23 applies a second set of configuration objects at a project level. The second set of policy rules includes project-specific application policy sets, firewall policies, firewall rules, and tags across a plurality of levels. Policy controller 23 distributes the second set of configuration objects at the project level. Policy controller 23 matches project tags of the session records for the traffic flows associated with project application policy sets, project firewall policies, and project firewall rules to objects tagged with the project tags. For example, policy controller 23 uses such project tags of the session records for the traffic flows to match workloads 37 to particular ones of the session records for the traffic flows and based on the matching tags, aggregates the session records for the traffic flows into the session records for workloads 37.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of tags to a plurality of objects within one or more data centers 10, obtain session records for traffic flows that include the tags, and aggregate, based on matching tags, such session records for the traffic flows into session records for workloads 37. Additional description regarding the distribution of simplified traffic policies may be found in U.S. patent application Ser. No. 15/819,522, filed Nov. 22, 2017 and entitled "Scalable Policy Management for Virtual Networks," which is incorporated by reference in its entirety.

In another example, policy controller 23 correlates the session records for the traffic flows into the session records for workloads 37 by applying a clustering algorithm to the session records for the traffic flows. For example, policy controller 23 may use the clustering algorithm to identify relationships between the session records for the traffic flows and specific workloads 37, and based on the relationships, aggregate the session records for the traffic flows into the session records for workloads 37.

Policy controller 23 generates, based on the plurality of session records of traffic statistics for the plurality of workloads 37, application firewall policies 202 for the plurality of workloads 37. Each of the plurality of application firewall policies comprises one or more application firewall policy rules, and each of the one or more application firewall policy rules defines whether one of VR agents 35 should allow or deny a traffic flow for a respective workload 37. For example, policy controller 23 may use a 5-tuple of a session record for a workload 37 to define a 5-tuple for an application firewall policy rule. Furthermore, policy controller 23 may define, based on the session record, a rule for the application firewall policy rule (e.g., allow, block, log, or report traffic that corresponds to the rule). In some examples, each application firewall policy rule specifies a default rule to allow corresponding network traffic, and all other network traffic that does not match a generated application firewall policy rule is blocked.

Virtual routers 30 may receive and apply application policies relevant to executing workloads 37 on the corresponding server 12, which results in traffic statistics for flows of flow sessions managed in part by the application policies. Such application policies may specify different action with respect to the flows. For example, an application policy may specify that a flow should be allowed, blocked, logged, reported, etc. As described in further detail below, virtual agents 35 upload traffic statistics for the flow sessions to collector 38. In the example of FIG. 2, collector 38 is a subcomponent of SDN controller 132. However, in other examples, collector 38 may be a separate component from SDN controller 132. In such an example where collector 38 is separate from SDN controller 132, virtual agents 35 may upload traffic statistics for the flow sessions to collector 38 or directly to policy controller 23.

In some examples, policy controller 23 presents, via UI device 129, the one or more application firewall policies to a user or administrator for review. In response to receiving an input from the user or administrator approving of the one or more application firewall policy rules, policy controller 23 distributes the one or more application firewall policy rules to VR agents 35 for application to network traffic.

Accordingly, the techniques of the disclosure may allow for policy controller 23 to automatically generate intent-based application firewall policies for workloads 37. In other words, policy controller 23 may use the session records of traffic statistics for workloads 37 to identify "intended" traffic relationships between workloads 37 and use the "intended" relationships to generate application firewall policies for workloads 37 for subsequent use so as to allow such "intended" traffic and block other forms of traffic. Therefore, the techniques of the disclosure may allow for the creation of firewall policies that are more comprehensive, accurate, flexible, and efficiently generated over conventional methods.

Figure 3:
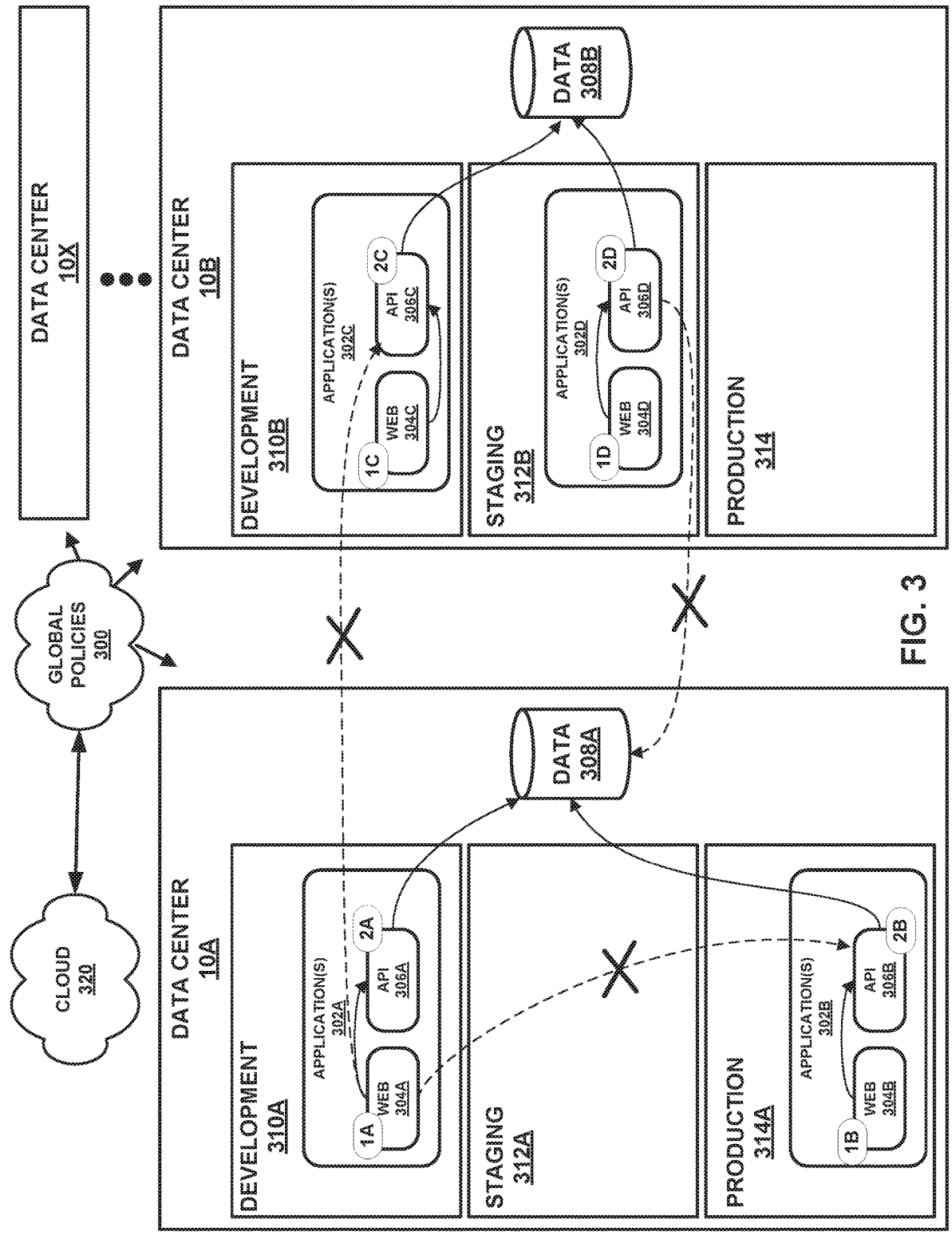
FIG. 3 is a block diagram illustrating an example of a plurality of data centers in accordance with techniques described herein.

FIG. 3 is a block diagram illustrating an example of a plurality of data centers 10 in accordance with techniques described herein. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10. Examples of data centers 10 may include a multi-cloud system, having one or more clouds coupled to the data centers 10, as illustratively represented by cloud 320. Cloud 320 may include one or a plurality of data centers, which in various examples includes data centers having the same or similar components and configured to perform some or all of the features and functions described herein with respect to data centers 10.

In the example of FIG. 3, each of data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of a finance application. Policies as described herein are robust and extensible for application in many different types of cloud environments described above.

Within an environment, each application 302 may include a plurality of workloads. In the example of FIG. 3, application 302A of development environment 310A executes example workloads web process 304A and Application Program Interface (API) process 306A. Further, application 302B of production environment 314A executes example workloads web process 304B and API process 306B. Application 302C of development environment 310B executes example workloads web process 304C and API process 306C. Still further, application 302D of staging environment 312B executes example workloads web process 304D and API process 306D. However, in other examples, each application 302 of a respective environment 310A, 312A, 314A, 310B, 312B, or 314B may execute additional or different processes and/or workloads than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306 operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

If the administrator were to independently manage network traffic policies for each process 304, 306 within each application 302 within each environment 312, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

In one example of the techniques of the disclosure, prior to deployment within a production environment, a customer may develop one or more applications 302 in a development environment for testing. Policy controller 23 of SDN controller 132 applies one or more tags specifying one or more categories to each process 304, 306. As depicted in the example of FIG. 3, policy controller 23 of SDN controller 132 applies tag "1A" to web process 304A, which specifies that web process 304A belongs to development environment 310A. Similarly, policy controller 23 applies tag "2A" to API process 306A, which specifies that web process 304A belongs to development environment 310A. In contrast, policy controller 23 applies tag "1B" to web process 304B and tag "2B" to API process 306B, each of which specify that the respective application belongs to production environment 314A. Furthermore, tag "1C" is applied to web process 304C and tag "2C" is applied API process 306C, each of which specify that the respective application belongs to development environment 310B; and tag "1D" is applied to web process 304D and tag "2D" is applied to API process 306D, each of which specify that the respective application belongs to staging environment 312B.

Virtual routers 30 of FIG. 2 process both ingress and egress flows of network traffic generated by the one or more applications and forwarded by each virtual router 30 to generate traffic flow statistics. Each virtual router 30 communicates the traffic flow statistics to a corresponding VR agent 35 of forwarding component 39. Each VR agent 35 processes the traffic flow statistics for the ingress flows and egress flows to identify pairs of the ingress and egress flows corresponding to a common communication session between workflows 37. For each identified pair, VR agent 35 generates session records of traffic statistics for the network traffic forwarded by virtual router 30. VR agent 35 uploads the session records, along with tag information for a given flow, to traffic collector 38 of SDN controller 32 for cloud data center 10. Typically, the session records contain all the tags associated with a source workload and a destination workload (or source port and destination port). Traffic collector 38 receives session records from a plurality of VR agents 35 and forwards the session records to policy controller 23 for analysis in accordance with the techniques of the disclosure.

Policy controller 23 receives, from traffic collector 38, the session records of traffic statistics for the traffic flows serviced by VR agents 35. Policy controller 23 correlates the plurality of session records of traffic statistics for the plurality of traffic flows into a plurality of session records of traffic statistics for the plurality of workloads 37 operating within the development environment.

With respect to the example of FIG. 3, policy controller 23 receives a first session record of traffic statistics for a first traffic flow comprising source tags of 1A and destination tags of 2A. Policy controller 23 determines that tags 1A are applied to web process 304A and tags 2A are applied to API process 306A. Thus, policy controller 23 may correlate the first session record for the first traffic flow to a first session record of traffic statistics for a workload corresponding to web process 304A (e.g., as the source of the first traffic flow). Further, policy controller 23 may correlate the first session record for the first traffic flow to a second session record of traffic statistics for a workload corresponding to API process 306A (e.g., as the destination of the first traffic flow).

As another example, policy controller 23 receives a second session record of traffic statistics for a second traffic flow comprising source tags of 2A and a destination of database 308A. Policy controller 23 determines that tags 2A are applied to API process 306A. Thus, policy controller 23 may correlate the second session record for the second traffic flow to the second session record for the workload corresponding to API process 306A (e.g., as the source of the second traffic flow). Policy controller 23 may correlate the second session record for the second traffic flow to the second session record for the workload corresponding to API process 306A in addition to, or in the alternative to, correlating the first session record of traffic statistics for the traffic flow to the second session record of traffic statistics for the workload corresponding to API process 306A (e.g., as the traffic flow destination).

As further illustration with respect to the example of FIG. 3, policy controller 23 correlates a session record of traffic statistics for a traffic flow comprising source tags of 1B and destination tags of 2B to a session record for a workload corresponding to web process 304B and a session record for a workload corresponding to API process 306B. Policy controller 23 correlates a session record of traffic statistics for a traffic flow comprising source tags of 2B and a destination database 308A to the session record for the workload corresponding to workload corresponding to API process 306B.

Likewise, policy controller 23 correlates a session record of traffic statistics for a traffic flow comprising source tags of 1C and destination tags of 2C to a session record for a workload corresponding to web process 304C and a session record for a workload corresponding to API process 306C. Policy controller 23 correlates a session record of traffic statistics for a traffic flow comprising source tags of 2C and a destination database 308B to the session record for the workload corresponding to workload corresponding to API process 306C.

Furthermore, policy controller 23 correlates a session record of traffic statistics for a traffic flow comprising source tags of 1D and destination tags of 2D to a session record for a workload corresponding to web process 304D and a session record for a workload corresponding to API process 306D. Policy controller 23 correlates a session record of traffic statistics for a traffic flow comprising source tags of 2D and a destination database 308B to the session record for the workload corresponding to workload corresponding to API process 306D.

Policy controller 23 generates, based on the plurality of session records of traffic statistics for the plurality of workloads 37, application firewall policies 202 for the plurality of workloads 37. Each of the plurality of application firewall policies comprises one or more application firewall policy rules, and each of the one or more application firewall policy rules defines whether one of VR agents 35 should allow or deny a traffic flow for a respective workload 37.

For example, and with respect to the example of FIG. 3, policy controller 23 determines from the first session record of traffic statistics for a workload corresponding to web process 304A that web process 304A sends network traffic to API process 306A. Thus, policy controller 23 generates a first application firewall policy for web process 304A comprising an application firewall policy rule that permits network traffic originating from web process 304A and is destined for API process 306A. In some examples, the first application firewall policy for web process 304A further specifies an application firewall policy rule blocking all other traffic originating from or destined for web process 304A.

As another example, policy controller 23 determines from the second session record of traffic statistics for a workload corresponding to API process 306A that web process 304A sends network traffic to API process 306A and API process 306A sends network traffic to database 308A. Thus, policy controller 23 generates a second application firewall policy for API process 306A comprising a first application firewall policy rule that permits network traffic originating from web process 304A and is destined for API process 306A and a second application firewall policy rule that permits network traffic originating from API process 306A and is destined for database 308A. In some examples, the second application firewall policy for API process 306A further specifies an application firewall policy rule blocking all other traffic originating from or destined for API process 306A.

Policy controller 23 may use the aforementioned operations to generate similar application firewall policies for web processes 304B, API process 306B, web processes 304C, API process 306C, web processes 304D, API process 306D. Thus, policy controller 23 may create application firewall policy rules that permit network traffic between the various workloads identified by the session records for the workloads.

In some examples, application firewall policies 202 further specify application firewall policy rules that block all other traffic other than the specific traffic flows described by the session records for the workloads. For example, because neither a session record for web process 304A nor a session record for API 306B identifies a traffic flow between web process 304A and API 306B, an application firewall policy for web process 304A or API 306B may disallow such traffic between web process 304A and API 306B. Similarly, traffic between web process 304A and API 306C may be disallowed, and traffic between API 306D and database 308A may be disallowed.

Policy controller 23 distributes the application firewall policies 202 to VR agents 35 for application to traffic flows. Thus, upon deployment within the production environment, VR agents 35 or policy agents 35 may apply the application firewall policies to traffic flows within the production environment.

For example, policy agent 35A receives the first application firewall policy for web process 304A comprising a first application firewall policy rule that permits network traffic originating from web process 304A and is destined for API process 306A. Policy agent 35A may subsequently permit network traffic flowing from an interface of a virtual machine executing web process 304A to an interface of a virtual machine executing API process 306A and block other traffic flowing to or from the interface of the virtual machine executing web process 304A not directed to API process 306A.

As another example, policy agent 35A receives a second application firewall policy for API process 306A comprising a first application firewall policy rule that permits network traffic originating from web process 304A and destined for API process 306A and a second application firewall policy rule that permits network traffic originating from API process 306A and destined for database 308A. Policy agent 35A may subsequently permit network traffic flowing from an interface of a virtual machine executing web process 304A to an interface of a virtual machine executing API process 306A or network traffic flowing from the interface of the virtual machine executing API process 306A to an interface for database 308A, and block other traffic flowing to or from the interface of the virtual machine executing API process 306A.

In the foregoing examples, policy agent 35A implements whitelisting, in that all traffic between designated interfaces of virtual machines is preemptively blocked, and the one or more policy rules whitelist specific traffic flows (e.g., specify specific traffic flows between interfaces of virtual machines that are permitted). In alternate examples, policy agent 35 implements blacklisting, in that all traffic between interfaces of virtual machines is preemptively allowed, and the one or more policy rules blacklist specific traffic flows (e.g., specify specific traffic flows between interfaces of virtual machines that are blocked). In alternate examples, the one or more policy rules may include a combination of whitelisting or blacklisting specific traffic flows or groups of traffic flows between interfaces of virtual machines.

Accordingly, the techniques of the disclosure may allow for policy controller 23 to automatically generate intent-based application firewall policies for workloads 37. In other words, policy controller 23 may use the session records of traffic statistics for workloads 37 to identify "intended" traffic relationships between workloads 37 within the development environment and use the "intended" relationships to generate application firewall policies for workloads 37 for use in the production environment so as to allow such "intended" traffic and block other forms of traffic. Therefore, the techniques of the disclosure may allow for the creation of firewall policies that are more comprehensive, accurate, flexible, and efficiently generated over conventional methods.

Figure 4:
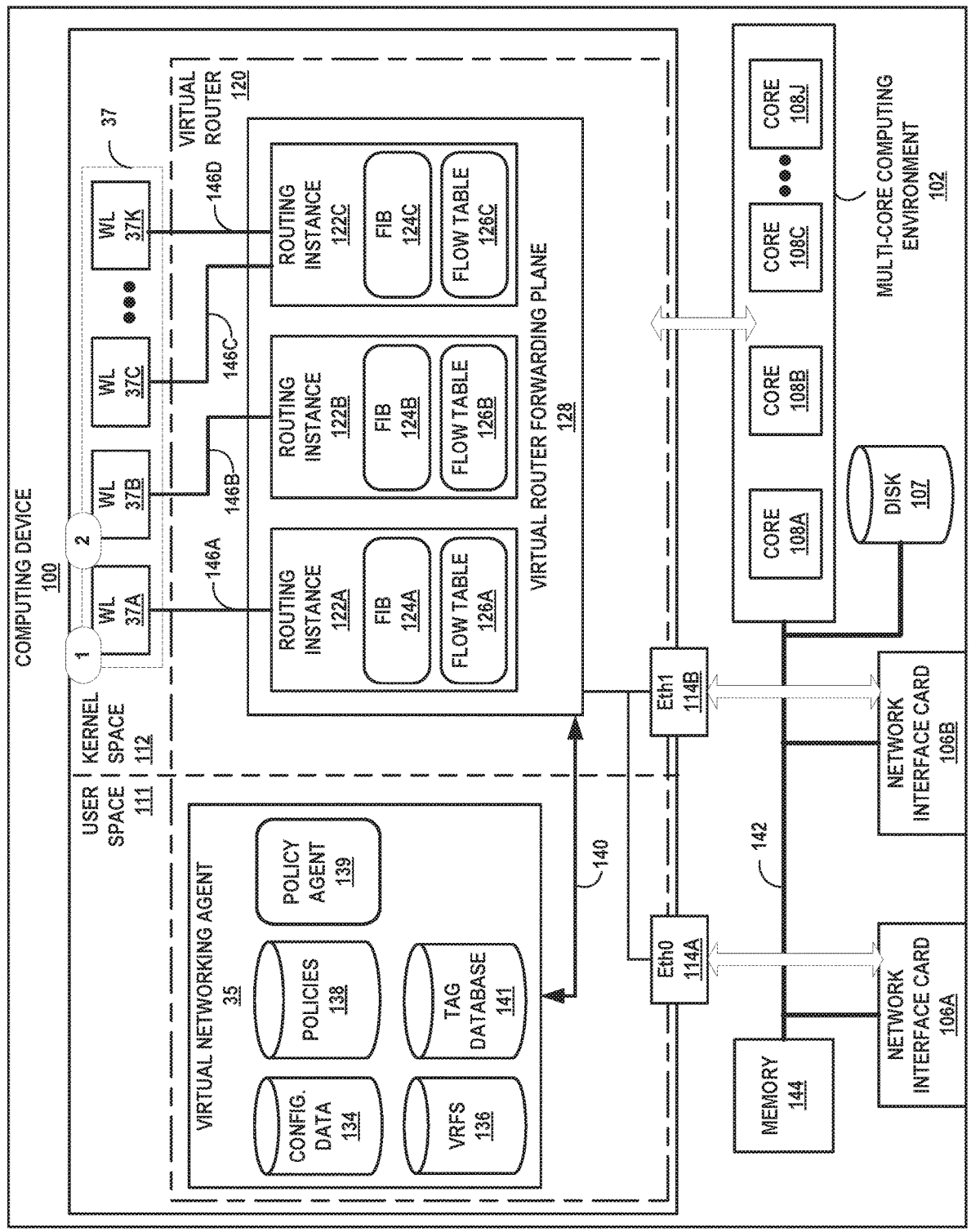
FIG. 4 is a block diagram illustrating an example computing device that executes a virtual router for virtual networks, in accordance with one or more aspects of the present disclosure.

FIG. 4 is a block diagram illustrating an example computing device 100 that executes a virtual router 120 for virtual networks in accordance with one or more aspects of the present disclosure. Computing device 100 may represent any of servers 12 of FIGS. 1-3 or other devices, such as any of TOR switches 16. Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more workloads 37. Workloads 37 may represent example instances of any of workloads 37 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage workloads 37 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120. Although depicted as executing within kernel space 112 for ease of illustration purposes, in some examples, workloads 37A-37K may execute in user space 111.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of WL 37A that taps, via tap interface 146A, into routing instance 122A.

Virtual router 120 in this example includes a kernel space 112 module: virtual router forwarding plane 128, as well as a user space 111 module: VN agent 35. Virtual router forwarding plane 128 executes the "forwarding plane" or packet forwarding functionality of the virtual router 120 and VN agent 35 executes the "control plane" functionality of the virtual router 120. VN agent 35 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request VN agent 35 to install a flow table entry in the flow table for the new packet flow. This may be referred to as "slow-path" packet processing for initial packets of packet flows and is represented in FIG. 4 by slow path 140.

In this example, VN agent 35 may be a user space 111 process executed by computing device 100. VN agent 35 includes configuration data 134, virtual router and forwarding instances configurations 136 ("VRFs 136"), and policy table 138 ("policies 138"). VN agent 35 exchanges control information with one or more virtual network controllers (e.g., SDN controller 132 of FIGS. 1-2). Control information may include, virtual network routes, low-level configuration state such as routing instances and forwarding policy for installation to configuration data 134, VRFs 136, and policies 138. VN agent 35 may also report analytics state, install forwarding state to FIBs 124 of virtual router forwarding plane 128, discover WLs 37 and attributes thereof. As noted above, VN agent 35 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In some examples, VN agent 35 further includes tag database 141. As described above, policy controller 23 of SDN controller 132 assigns one or more tags specifying one or more levels and/or one or more categories for the objects. Policy controller 23 may apply tags to objects across a plurality of levels or categories, as well as apply the tags to objects across a plurality of data centers. Policy controller 23 distributes these tags to VN agent 35, which stores the assigned tags in tag database 141.

In the example of FIG. 4, policy agent 139 is a subcomponent of VN agent 35. Policy agent 139 may function in a substantially similar fashion to policy agent 35 of FIG. 1. Policy agent 139 receives, from policy controller 23, one or more policies and stores such policies in policies 138. Each of policies 138 may include one or more policy rules that specify whether particular network traffic should be allowed or blocked. Further, each policy rule includes one or more policy tags that specify to which objects, such as applications executing on WLs 37, the policy rules apply. For example, policy agent 139 may cross reference the one or more tags of a policy rule with one or more tags in tag database 141 to determine one or more objects to which the policy rule should be applied. Upon determining the one or more objects to which the policy rule should be applied, policy agent 139 allows or blocks network traffic originating from or destined to the one or more objects in accordance with the policy rule. In some examples, policy agent 139 allows or blocks network traffic at an interface level of WLs 37. In this example, interfaces 146 inherit tags from parent objects, such as WLs 37, virtual networks, parent projects, or global policy sets. 10. Thus, policy agent 139 allows or blocks network traffic destined for or originating from interfaces 146 of WLs 37 by matching tags of one or more policy rules to tags applied to interfaces 146.

For example, policy agent 35A receives the first application firewall policy for web process 304A comprising a first application firewall policy rule that permits network traffic originating from web process 304A and is destined for API process 306A. Policy agent 35A may subsequently permit network traffic flowing from an interface of a virtual machine executing web process 304A to an interface of a virtual machine executing API process 306A and block other traffic flowing to or from the interface of the virtual machine executing web process 304A not directed to API process 306A.

As another example, policy agent 35A receives a second application firewall policy for API process 306A comprising a first application firewall policy rule that permits network traffic originating from web process 304A and destined for API process 306A and a second application firewall policy rule that permits network traffic originating from API process 306A and destined for database 308A. Policy agent 35A may subsequently permit network traffic flowing from an interface of a virtual machine executing web process 304A to an interface of a virtual machine executing API process 306A or network traffic flowing from the interface of the virtual machine executing API process 306A to an interface for database 308A, and block other traffic flowing to or from the interface of the virtual machine executing API process 306A.

To update policies for a particular object or group of objects, an administrator may instruct policy controller 23 to distribute new policies to policy agents 139 of respective VN agents 35 of a plurality of data centers 10. In some examples, policy controller 23 distributes the new policies via a BGP message. In this fashion, an administrator may manage a scalable, multi-dimensional policy framework for a plurality of data centers. Further, each policy agent 139 may automatically apply the relevant policies without requiring the administrator to individually manage or update policies for each VN agent 35. Thus, the techniques of the disclosure may greatly reduce the complexity and simplify management of such policies across the plurality of data centers 10.

Figure 5:
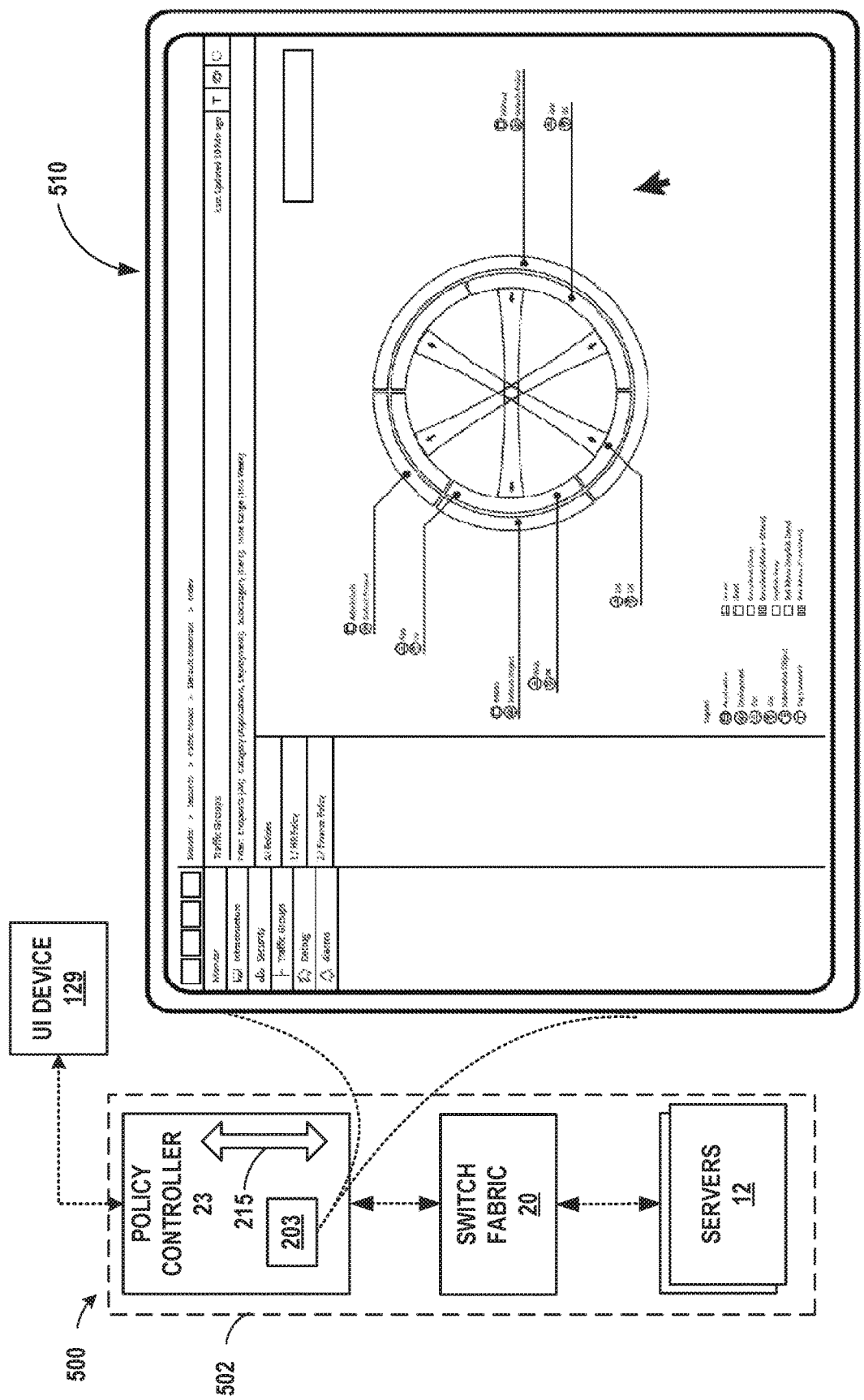
FIG. 5 is a block diagram of an example network in which a controller manages servers or compute nodes and provides a visualization of various aspects related to workflows and policy objects associated with a computer network through a dashboard, in accordance with one or more aspects of the present disclosure.

FIG. 5 is a block diagram of an example network 500 in which policy controller 23 manages servers or compute nodes and provides a visualization of various aspects related to workflows and policy objects associated with a computer network through a dashboard 203, in accordance with one or more aspects of the present disclosure. In the example illustrated in FIG. 5, policy controller 23 is shown as part of cluster 502. In other examples, however, policy controller 23 is not part of cluster 502, and in such an example, "cluster 502" refers to the compute nodes but not the controller. Cluster 502 of FIG. 5 may represent a cloud-based computing network and/or a computing domain or project, or other types of computing clusters. Where cluster 502 of FIG. 5 represents a cloud environment, such a cloud environment may be an OpenStack cloud environment or a Kubernetes cloud environment. Cluster 502 may be distributed across multiple environments, such as different data centers.

Policy controller 23 may operate in the manner described and illustrated in connection with FIGS. 1-4. For example, policy controller 23 may gather and publish information related to the tags names or tag values assigned to each of the tags that have been assigned to the workloads executed as part of a projects and/or by a virtual network, included in a computer system.

Dashboard 203 may be implemented in the manner described and illustrated in connection with FIGS. 1-4. As described in connection with FIG. 1, dashboard 203 may be created, updated, and/or maintained primarily by policy controller 23 and/or by a dashboard module executing on policy controller 23. In some examples, a computing device separate from policy controller 23 may generate dashboard 203. As illustrated in FIG. 5, policy controller 23 may generate dashboard 203, which may represent a collection of graphical user interfaces (e.g., including user interface 510) that provide information about topology, structure, hierarchy, utilization, and/or performance statuses and metrics associated with infrastructure elements and workloads being executed within the computer network being monitored. Policy controller 23 generates and outputs a graphical user interface screen, e.g., user interface 510, for display by user interface device 129. In the example of FIG. 5, user interface 510 includes a set of graphical elements arranged within the graphical user interface according to the examples and techniques described below, and any equivalents thereof. Policy controller 23 may use tag information and tag values assigned to the tags to label the graphical elements being displayed as part of graphical user interface displayed by user interface device 129. Such tag information may identify each of servers 12 as hosting one or more instances of a policy object, and may be arranged in a manner that illustrates the category and sub-categories assigned to these policy objects.

Different colors may be utilized to render each of the graphical elements associated with the particular policy objects being displayed to help provide visual distinction between separate policy objects within the graphical user interface. In addition, interconnection elements, representing communications between policy objects, may extend for example between a pair of graphical elements representing two respective policy objects, A color indicator may be used to render the interconnection element, the color used to indicate a particular status assigned to or defined for the communications being depicted by the particular interconnection element.

In some examples, policy controller 23 may, in response to inputs from a user (e.g., interactions within the display area of user interface 510), generate or update the graphical user interfaces within dashboard 203 so that infrastructure elements are filtered by devices type, interconnections, health, risk, aggregate, project, network (virtual or physical), type, and/or in other ways for example by tags and/or category/sub-category groupings. In such examples, a filter may cause some graphical elements to be hidden within dashboard 203 or a user interface of dashboard 203, while presenting other graphical elements within dashboard 203 based on the filter inputs. Filters may be applied using functional paradigms. For example, each filter may correspond to a function, so that for a given set of "x" resources, elements, or other items to be filtered, and filter functions "f" and "g," application of the filter may compute f(g(x)). Where filters follow functional paradigms, applying filters in a different order (e.g., g(f(x))) will have the same result. In some examples, some or all of filter functions are pure, so that no state information outside of the function's context is changed. Every time a filter value (or other user interface component) is changed, policy controller 23 may apply an appropriate filter to all the resources in a resource hash table, and then reassign the resource array to the resultant array. Filters may be applied and/or reapplied when an interaction with user interface 510 is detected, when one or more infrastructure element representations within main display area 513 are selected or changed, when metric data is received by policy controller 23, and/or in other situations.

In some examples, as part of generating user interface 510 policy controller 23 provides a visual display of circular shaped rings, which may be referred to as the "tag view," and which may be displayed as a default version of the graphical user interface provided by dashboard 203. The "tag view" of the graphical user interface may also be displayed based on receiving an input to dashboard 203 of the selection of the "tag" option included in a view selection menu as further illustrated and described below with respect to FIG. 8. In other examples, policy controller 23 provides an arrangement of information in a two-dimensional grid of one or more columns and one or more rows. Various user inputs may be provided to the graphical user interface being displayed at any given time by dashboard 203 to allow for more or less detail related to a specific policy objects, a project, a specific communication interconnection, a specific agent, a virtual network, or related to a specific port or virtual address to be rendered as the user interface being displayed by dashboard 203.

In some examples, policy controller 23 presents, via dashboard 203 and to a user or administrator for review, one or more application firewall policies that are generated based on session records of traffic statistics for the plurality of application workloads in the fashion described above with respect to FIGS. 1-4. In response to receiving an input from the user or administrator approving of the one or more application firewall policy rules, policy controller 23 distributes the one or more application firewall policy rules to VR agents 35 for application to network traffic as described above.

The systems, devices and methods as described in this disclosure allow the generation of these graphical user interfaces that depict, in real-time or near real-time, various graphical depictions associated with the operation of the projects and virtual networks, and the associated communications occurring within a computer network being monitored. In addition, the graphical user interfaces allow display of these projects and virtual network in a manner that organizes these graphical elements depicting the policy objects and associated communications based on the tags and categories/sub-categories assigned to these policy objects and communication interconnections.

Although the graphical elements as described throughout this disclosure may relate to projects and virtual networks operating within a computer network being modeled by the graphical user interfaces, the representations included in the examples of graphic user interfaces are not limited to projects and/or virtual networks. Graphic elements as described in this disclosure may include graphic symbols representing virtual entities, such as virtual servers, virtual router, and/or virtual instance of other computer/software entities that may have connections to one or more physical devices and/or to other virtual entities that may be graphically rendered and visually represented in a graphical user interfaces according to any of the examples described in this disclosure.

The graphical user interfaces described in this disclosure, and any equivalents thereof that may be generated and displayed using the systems, devices, and methods described herein, provide a visual tool that may allow a user, such as an information technology (IT) professional or a technician, to quickly and efficiently model, visualize, and locate issues associated with the performance of a computer network in real or near real-time. The user interfaces as described in this disclosure allow a user to view a variety of relationships between policy objects, including the communication interconnections and policy rules associated with these commination interconnections for a plurality of policy objects operating within the computer system being depicted by the graphical user interface, and to quickly move to more a detailed-level graphical user interface that provides a visual representation of more specific information, such as graphical and/or textual information associated with various policy objects and/or communications occurring within the computer network based on simple inputs to the system generating the graphical user interfaces, such as inputs to user interface 129 coupled to policy controller 23.

FIG. 6 is a table illustrating a plurality of example session records 600 of traffic statistics for traffic flows in accordance with techniques of the disclosure. In some examples, the plurality of session records 600 may be collected by traffic collector 38 as described above. In some examples, session records 600 specify, for each traffic flow, a plurality of information and metadata describing the flow. As one example, session records 600 specify, for each traffic flow, 5-tuple information (e.g., a source address of the flow, a source port of the flow, a destination address of the flow, a destination port of the flow, and a protocol of the flow.

In some examples, session records 600 specify other types of information, such as a tag applied to one or more objects associated with the flow. In the example of FIG. 6, session records 600 specify a tag of a workload associated with the flow (e.g., a web application, a finance application, or an email application, etc.).

Figure 7:
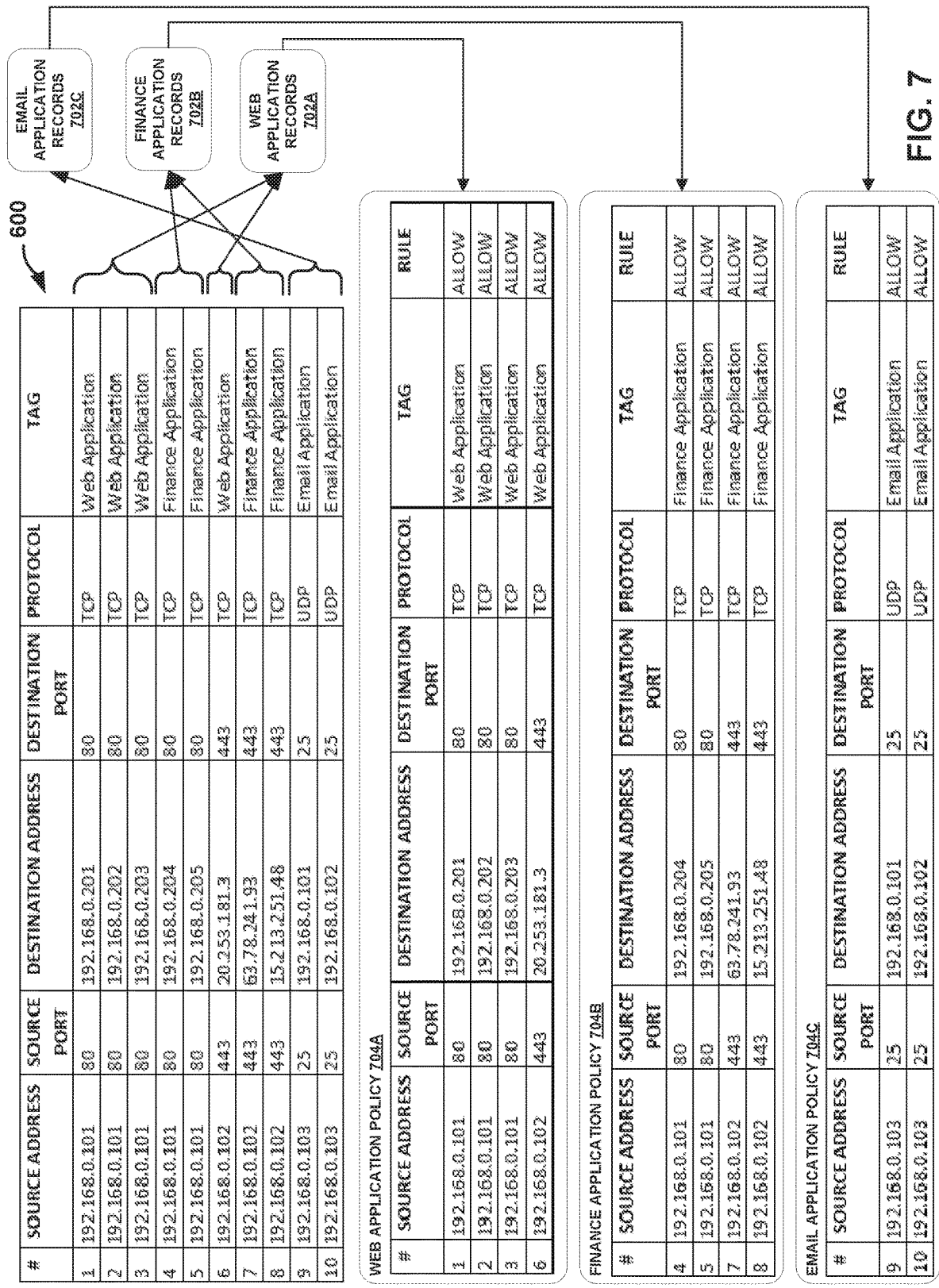
FIG. 7 is a diagram illustrating the conversion of the plurality of example session records of traffic statistics for traffic flows of FIG. 6 into a plurality of firewall policies in accordance with techniques of the disclosure.

FIG. 7 is a diagram illustrating the conversion of the plurality of example session records 600 of traffic statistics for traffic flows of FIG. 6 into a plurality of firewall policies in accordance with techniques of the disclosure.

Based on tags of session records 600 applied to one or more objects associated with the flows, policy controller 23 correlates session records 600 to session records of traffic statistics for one or more workloads associated with tags. For example, policy controller 23 may correlate, based on tags specified by session records 600, flows 1, 2, 3, and 6 to session records 702A of traffic statistics for a web application, flows 4, 5, 7, and 8 to session records 702B of traffic statistics for a finance application, and flows 9 and 10 to session records 702C of traffic statistics for an email application (collectively, "session records 702 of traffic statistics for the workloads").

Policy controller 23 generates, based on the session records 702 of traffic statistics for the workloads, one or more application firewall policies 704A-704C (collectively, application firewall policies 704"). For example, based on session records 702A for the web application, policy controller 23 generates web application policy 704A that includes web application policy rules allowing the corresponding traffic flows 1, 2, 3, and 6, respectively. Similarly, based on session records 702B for the finance application, policy controller 23 generates finance application policy 704B that includes finance application policy rules allowing the corresponding traffic flows 4, 5, 7, and 8, respectively. Furthermore, based on session records 702C for the email application, policy controller 23 generates email application policy 704C that includes email application policy rules allowing the corresponding traffic flows 9 and 10, respectively. In some examples, each of application firewall policies 704 block all other traffic associated with the corresponding application that is not specifically whitelisted by an application firewall policy rule of the application firewall policy 704.

Figure 8:
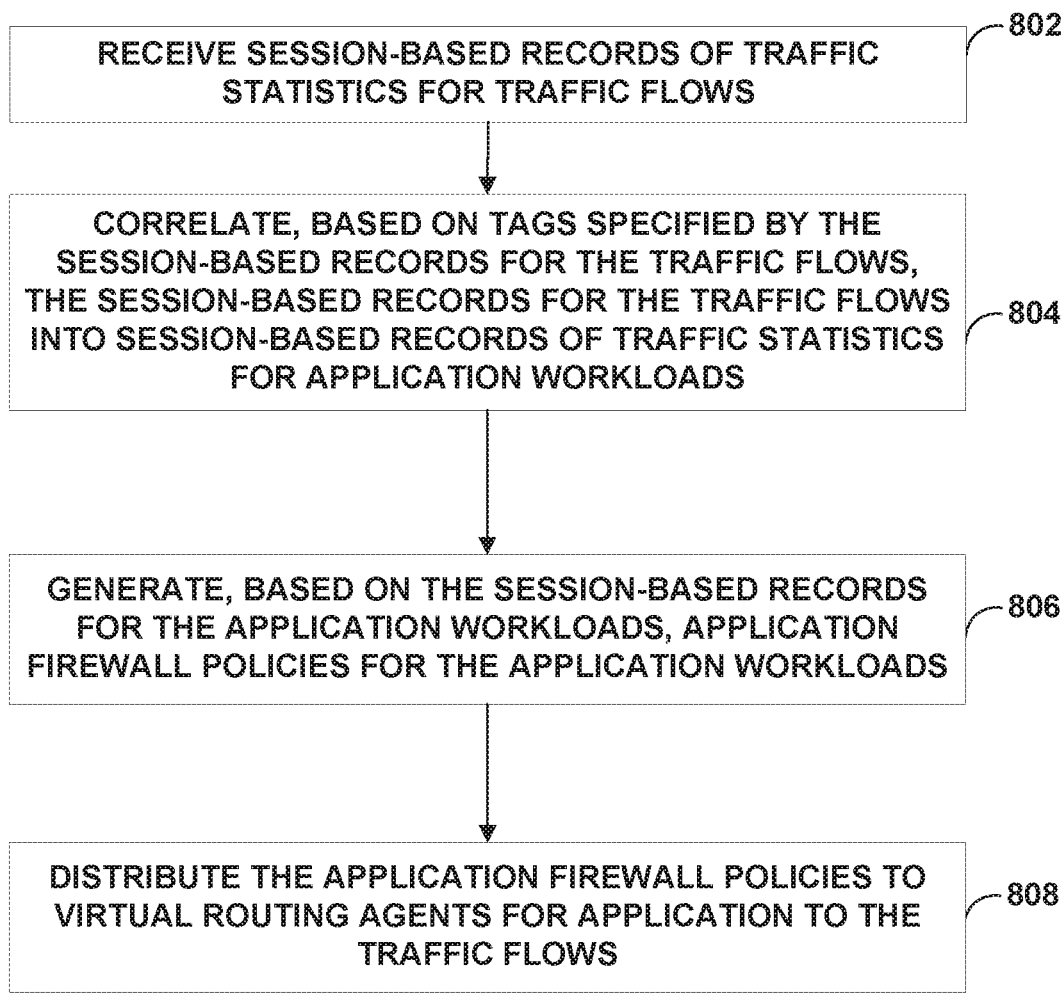
FIG. 8 is a flowchart illustrating an example operation for generating a plurality of firewall policies in accordance with techniques of the disclosure.

FIG. 8 is a flowchart illustrating an example operation for generating a plurality of firewall policies in accordance with techniques of the disclosure. FIG. 8 is described with respect to FIG. 1 for convenience, although the operations of FIG. 8 may be applied to FIGS. 2 and 3 as well.

In one example, virtual routers 30 of FIG. 2 process both ingress and egress flows of network traffic generated by the one or more applications and forwarded by each virtual router 30 to generate traffic flow statistics. Each virtual router 30 communicates the traffic flow statistics to a corresponding VR agent 35. Each VR agent 35 processes the traffic flow statistics for the ingress flows and egress flows to identify pairs of ingress and egress flows corresponding to a common communication session between workflows 37. For each identified pair, VR agent 35 generates session records of traffic statistics for the network traffic forwarded by virtual router 30. VR agent 35 uploads the session records, along with tag information for a given flow, to traffic collector 38 of SDN controller 32 for cloud data center 10. Traffic collector 38 receives session records from a plurality of VR agents 35 and forwards the session records to policy controller 23.

Policy controller 23 receives, from traffic collector 38, the session records of traffic statistics for a plurality of traffic flows (802). Policy controller 23 correlates, based on tags specified by the session records for the plurality of traffic flows, the session records for the plurality of traffic flows into session records of traffic statistics for a plurality of application workloads 37 (804). For example, policy controller 23 uses tags specified by the session records for the plurality of traffic flows to match application workloads 37 to particular ones of the session records for the traffic flows. Based on tags applied to workloads 37 that match tags specified by the session records for the plurality of traffic flows, policy controller 23 aggregates the session records for the traffic flows into the session records for application workloads 37.

Policy controller 23 generates, based on the session records of traffic statistics for the plurality of application workloads 37, one or more application firewall policies for the plurality of application workloads 37 (806). Each of the plurality of application firewall policies comprises one or more application firewall policy rules, and each of the one or more application firewall policy rules defines whether one of VR agents 35 should allow or deny a traffic flow for a respective workload 37. For example, policy controller 23 may use a 5-tuple of a session record for a workload 37 to define a 5-tuple for an application firewall policy rule. Furthermore, policy controller 23 may define, based on the session record, a rule for the application firewall policy rule (e.g., allow, block, log, or report traffic that corresponds to the rule). In some examples, each application firewall policy rule specifies a default rule to allow corresponding network traffic, and all other network traffic that does not match a generated application firewall policy rule is blocked.

Policy controller 23 distributes the one or more application firewall policies to the virtual router agents 35 for application to the plurality of traffic flows (808). VR agents 35 may subsequently apply the application firewall policies to traffic flows within network 8. In some examples, prior to distributing the one or more application firewall policies, policy controller 23 presents, via UI device 129, the one or more application firewall policies to a user or administrator for review. In response to receiving an input from the user or administrator approving of the one or more application firewall policy rules, policy controller 23 distributes the one or more application firewall policy rules to VR agents 35 for application to network traffic. The VR agents 35 that collect traffic statistics and relay the traffic statistics to the policy controller 23 may be different than the VR agents that receive and apply the one or more application firewall policies applied to subsequent traffic among the workloads 37.

Accordingly, the techniques of the disclosure may allow for policy controller 23 to automatically generate intent-based application firewall policies for workloads 37. In other words, policy controller 23 may use the session records of traffic statistics for workloads 37 to identify "intended" traffic relationships between workloads 37 within the development environment and use the "intended" relationships to generate application firewall policies for workloads 37 for use in the production environment so as to allow such "intended" traffic and block other forms of traffic. Therefore, the techniques of the disclosure may allow for the creation of firewall policies that are more comprehensive, accurate, flexible, and efficiently generated over conventional methods.

Figure 9:
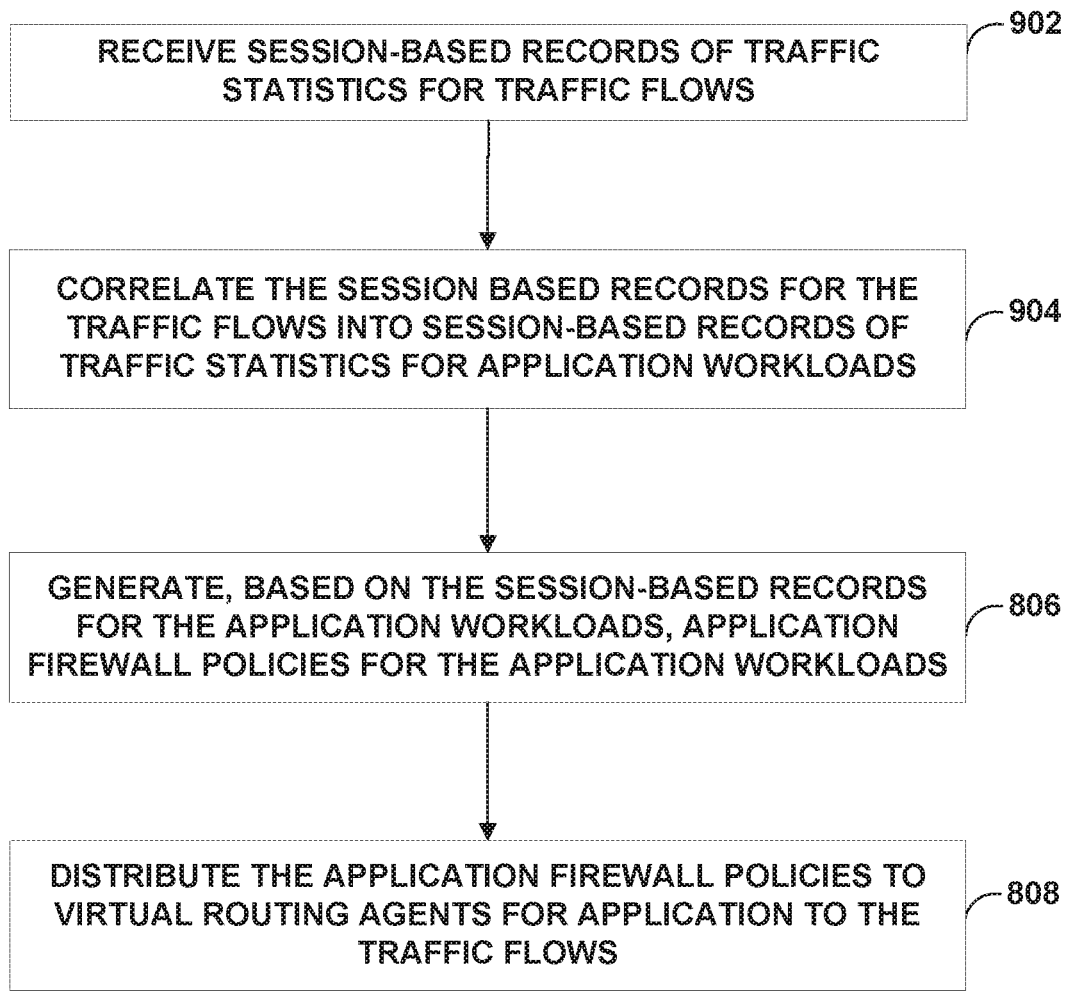
FIG. 9 is a flowchart illustrating an example operation for generating a plurality of firewall policies in accordance with techniques of the disclosure.

FIG. 9 is a flowchart illustrating an example operation for generating a plurality of firewall policies in accordance with techniques of the disclosure. FIG. 9 is described with respect to FIG. 1 for convenience, although the operations of FIG. 9 may be applied to FIGS. 2 and 3 as well.

Policy controller 23 receives, from traffic collector 38, the session records of traffic statistics for a plurality of traffic flows (902). Operation 902 may occur in a substantially similar fashion as described above with respect to operation 802 of FIG. 8.

Policy controller 23 correlates the session records for the plurality of traffic flows into session records of traffic statistics for a plurality of application workloads 37 (904). However, in this example, contrary to the operation of FIG. 8, Policy controller 23 correlates the session records for the plurality of traffic flows into session records of traffic statistics for a plurality of application workloads 37 without the use of matching tags. As one example, to correlate the session records for the traffic flows into the session records for workloads 37, the policy controller 23 presents, via UI device 129, the plurality of session records of traffic statistics for the plurality of traffic flows to a user or administrator. Further, policy controller 23 receives, via UI device 129, an input that specifies which traffic flows of the plurality of traffic flows correspond to a respective application workload 37 of the plurality of application workloads 37, and based on the input, aggregates the session records for the traffic flows into the session records for workloads 37.

In another example, policy controller 23 correlates the session records for the traffic flows into the session records for workloads 37 by applying a clustering algorithm to the session records for the traffic flows. For example, policy controller 23 may use the clustering algorithm to identify relationships between the session records for the traffic flows and specific workloads 37, and based on the relationships, aggregate the session records for the traffic flows into the session records for workloads 37.

Policy controller 23 generates, based on the session records of traffic statistics for the plurality of application workloads 37, one or more application firewall policies for the plurality of application workloads 37 (806) in a substantially similar fashion as described above with respect to operation 806 of FIG. 8. Further, policy controller 23 distributes the one or more application firewall policies to the virtual router agents 35 for application to the plurality of traffic flows (808) in a substantially similar fashion as described above with respect to operation 808 of FIG. 8. VR agents 35 may subsequently apply the application firewall policies to traffic flows within network 8. Accordingly, the techniques of the disclosure may allow for policy controller 23 to automatically generate intent-based application firewall policies for workloads 37. In other words, policy controller 23 may use the session records of traffic statistics for workloads 37 to identify "intended" traffic relationships between workloads 37 within the development environment and use the "intended" relationships to generate application firewall policies for workloads 37 for use in the production environment so as to allow such "intended" traffic and block other forms of traffic. Therefore, the techniques of the disclosure may allow for the creation of firewall policies that are more comprehensive, accurate, flexible, and efficiently generated over conventional methods.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A method comprising:
receiving, by a policy controller for a computer network, traffic statistics for a plurality of traffic flows among first instances of a plurality of application workloads, the first instances of the plurality of application workloads executed by a first set of one or more computing devices of a computer network;
correlating, by the policy controller and based on one or more tags specified by the traffic statistics for the plurality of traffic flows, the traffic statistics for the plurality of traffic flows into session records of traffic statistics for the plurality of application workloads;
generating, by the policy controller and based on the session records of traffic statistics for the plurality of application workloads, one or more application firewall policies for the plurality of application workloads, wherein the one or more application firewall policies define whether traffic flows between application workloads of the plurality of application workloads are to be allowed or denied; and
distributing, by the policy controller, the one or more application firewall policies to a second set of one or more computing devices for application to traffic flows among second instances of the plurality of application workloads, the second instances of the plurality of application workloads executed by the second set of one or more computing devices, wherein the second set of one or more computing devices is different from the first set of one or more computing devices.
2. The method of claim 1,
wherein receiving the traffic statistics for the plurality of traffic flows among the first instances of the plurality of application workloads comprises receiving, from a first set of virtual router agents for the first set of one or more computing devices, the traffic statistics for the plurality of traffic flows among the first instances of the plurality of application workloads, and
wherein distributing the one or more application firewall policies to the second set of one or more computing devices for application to traffic flows among the second instances of the plurality of application workloads comprises distributing the one or more application firewall policies to a second set of virtual router agents for the second set of one or more computing devices for application to the traffic flows among the second instances of the plurality of application workloads.

3. The method of claim 2, further comprising applying, by the second set of virtual router agents, the one or more application firewall policies to the traffic flows among the second instances of the plurality of application workloads to at least one of allow or deny at least one traffic flow.

4. The method of claim 1, further comprising presenting, by the policy controller, the one or more application firewall policies for display to a user.

5. The method of claim 1, wherein correlating, based on the one or more tags specified by the traffic statistics for the plurality of traffic flows, the traffic statistics for the plurality of traffic flows into session records of traffic statistics for the plurality of application workloads comprises:
   receiving, by the policy controller and from a user, an input that specifies which traffic flows of the plurality of traffic flows correspond to application workloads of the plurality of application workloads; and
   correlating, by the policy controller and based on the input and the one or more tags specified by the traffic statistics for the plurality of traffic flows, the traffic statistics for the plurality of traffic flows into session records of traffic statistics for the plurality of application workload.

6. The method of claim 1, wherein correlating, based on the one or more tags specified by the traffic statistics for the plurality of traffic flows, the traffic statistics for the plurality of traffic flows into session records of traffic statistics for the plurality of application workloads comprises:
   applying, by the policy controller, a clustering algorithm to identify which traffic flows of the plurality of traffic flows correspond to application workloads of the plurality of application workloads; and
   correlating, by the policy controller and based on the clustering algorithm and the one or more tags specified by the traffic statistics for the plurality of traffic flows, the traffic statistics for the plurality of traffic flows into session records of traffic statistics for the plurality of application workloads.

7. The method of claim 1, wherein generating, based on the session records of traffic statistics for the plurality of application workloads, the one or more application firewall policies for the plurality of application workloads comprises:
   for each application workload of the plurality of application workloads:
      identifying one or more traffic flows of the plurality of traffic flows associated with an instance of the application workload;
      generating one or more application firewall policy rules for the application workload, wherein each application firewall policy rule of the one or more application firewall policy rules comprises a 5-tuple that is the same as a 5-tuple of a corresponding traffic flow of the one or more traffic flows associated with the instance of the application workload and a rule specifying an action to perform on the corresponding traffic flow; and
      generating an application firewall policy for the application workload that comprises the one or more application firewall policy rules for the application workload.

8. The method of claim 7, wherein the action to perform on the corresponding traffic flow is one or more of:
   one of allowing the corresponding traffic flow or denying the corresponding traffic flow;
   logging the corresponding traffic flow; and
   reporting the corresponding traffic flow.

9. The method of claim 1, wherein the session records of traffic statistics for each traffic flow of the plurality of traffic flows comprise one or more of:
   one or more tags for a source of the traffic flow; and
   one or more tags for a destination of the traffic flow.

10. A policy controller of a computer network, wherein the policy controller comprises processing circuitry, and wherein the policy controller is configured to:
   receive traffic statistics for a plurality of traffic flows among first instances of a plurality of application workloads, the first instances of the plurality of application workloads executed by a first set of one or more computing devices of the computer network;
   correlate, based on one or more tags specified by the traffic statistics for the plurality of traffic flows, the traffic statistics for the plurality of traffic flows into session records of traffic statistics for the plurality of application workloads;
   generate, based on the session records of traffic statistics for the plurality of application workloads, one or more application firewall policies for the plurality of application workloads,
   wherein the one or more application firewall policies define whether traffic flows between application workloads of the plurality of application workloads are to be allowed or denied; and
   distribute the one or more application firewall policies to a second set of one or more computing devices for application to traffic flows among second instances of the plurality of application workloads, the second instances of the plurality of application workloads executed by the second set of one or more computing devices, wherein the second set of one or more computing devices is different from the first set of one or more computing devices.

11. The policy controller of claim 10,
   wherein, to receive the traffic statistics for the plurality of traffic flows among the first instances of the plurality of application workloads, the policy controller is further configured to receive, from a first set of virtual router agents for the first set of one or more computing devices, the traffic statistics for the plurality of traffic flows among the first instances of the plurality of application workloads, and
   wherein, to distribute the one or more application firewall policies to the second set of one or more computing devices for application to traffic flows among the second instances of the plurality of application workloads, the policy controller is further configured to distribute the one or more application firewall policies to a second set of virtual router agents for the second set of one or more computing devices for application to the traffic flows among the second instances of the plurality of application workloads.

12. The policy controller of claim 10, wherein the policy controller is further configured to present the one or more application firewall policies for display to a user.

13. The policy controller of claim 10, wherein, to correlate, based on the one or more tags specified by the traffic statistics for the plurality of traffic flows, the traffic statistics for the plurality of traffic flows into session records of traffic statistics for the plurality of application workloads, the policy controller is further configured to:
- receive, from a user, an input that specifies which traffic flows of the plurality of traffic flows correspond to application workloads of the plurality of application workloads; and
- correlate, by the policy controller and based on the input and the one or more tags specified by the traffic statistics for the plurality of traffic flows, the traffic statistics for the plurality of traffic flows into session records of traffic statistics for the plurality of application workload.

14. The policy controller of claim 10, wherein, to correlate, based on the one or more tags specified by the traffic statistics for the plurality of traffic flows, the traffic statistics for the plurality of traffic flows into session records of traffic statistics for the plurality of application workloads, the policy controller is further configured to:
- apply a clustering algorithm to identify which traffic flows of the plurality of traffic flows correspond to application workloads of the plurality of application workloads; and
- correlate, based on the clustering algorithm and the one or more tags specified by the traffic statistics for the plurality of traffic flows, the traffic statistics for the plurality of traffic flows into session records of traffic statistics for the plurality of application workloads.

15. The policy controller of claim 10, wherein, to generate, based on the session records of traffic statistics for the plurality of application workloads, the one or more application firewall policies for the plurality of application workloads, the policy controller is further configured to:
- for each application workload of the plurality of application workloads:
  - identify one or more traffic flows of the plurality of traffic flows associated with an instance of the application workload;
  - generate one or more application firewall policy rules for the application workload, wherein each application firewall policy rule of the one or more application firewall policy rules comprises a 5-tuple that is the same as a 5-tuple of a corresponding traffic flow of the one or more traffic flows associated with the instance of the application workload and a rule specifying an action to perform on the corresponding traffic flow; and
  - generate an application firewall policy for the application workload that comprises the one or more application firewall policy rules for the application workload.

16. The policy controller of claim 15, wherein the action to perform on the corresponding traffic flow is one or more of:
- one of allowing the corresponding traffic flow or denying the corresponding traffic flow;
- logging the corresponding traffic flow; and
- reporting the corresponding traffic flow.

17. The policy controller of claim 10, wherein the session records of traffic statistics for each traffic flow of the plurality of traffic flows comprise one or more of:
- one or more tags for a source of the traffic flow; and
- one or more tags for a destination of the traffic flow.

18. A non-transitory computer-readable medium comprising instructions that, when executed, cause processing circuitry executing a policy controller for a computer network to:
- receive traffic statistics for a plurality of traffic flows among first instances of a plurality of application workloads, the first instances of the plurality of application workloads executed by a first set of one or more computing devices of a computer network;
- correlate, based on one or more tags specified by the traffic statistics for the plurality of traffic flows, the traffic statistics for the plurality of traffic flows into session records of traffic statistics for the plurality of application workloads;
- generate, based on the session records of traffic statistics for the plurality of application workloads, one or more application firewall policies for the plurality of application workloads, wherein the one or more application firewall policies define whether traffic flows between application workloads of the plurality of application workloads are to be allowed or denied; and distribute the one or more application firewall policies to a second set of one or more computing devices for application to traffic flows among second instances of the plurality of application workloads, the second instances of the plurality of application workloads executed by the second set of one or more computing devices, wherein the second set of one or more computing devices is different from the first set of one or more computing devices.

* * * * *